(12) United States Patent
Nayak et al.

(10) Patent No.: US 12,152,901 B2
(45) Date of Patent: Nov. 26, 2024

(54) SYSTEM AND METHOD FOR PROCESSING EVENT DATA

(71) Applicant: HERE Global B.V., Eindhoven (NL)

(72) Inventors: Amarnath Nayak, Mumbai (IN); Leon Stenneth, Chicago, IL (US); Alex Averbuch, Buffalo Grove, IL (US)

(73) Assignee: HERE Global B.V., Eindhoven (NL)

( * ) Notice: Subject to any disclaimer, the term of this patent is extended or adjusted under 35 U.S.C. 154(b) by 374 days.

(21) Appl. No.: 17/824,521

(22) Filed: May 25, 2022

(65) Prior Publication Data

US 2023/0384113 A1 Nov. 30, 2023

(51) Int. Cl.
*G01C 21/00* (2006.01)
*G06F 16/29* (2019.01)

(52) U.S. Cl.
CPC ...... *G01C 21/3811* (2020.08); *G01C 21/3841* (2020.08); *G01C 21/3881* (2020.08); *G01C 21/3896* (2020.08); *G06F 16/29* (2019.01)

(58) Field of Classification Search
CPC ...... G01C 21/381; G01C 2/3893; G06F 16/29
USPC ...................................................... 701/409
See application file for complete search history.

(56) References Cited

U.S. PATENT DOCUMENTS

| | | | |
|---|---|---|---|
| 9,812,011 B1* | 11/2017 | Stenneth | G08G 1/096741 |
| 2018/0247542 A1* | 8/2018 | Koduru | G08G 5/0026 |
| 2020/0250864 A1 | 8/2020 | Raut et al. | |
| 2021/0108942 A1 | 4/2021 | Stenneth | |

OTHER PUBLICATIONS

Jo et al., "Cloud update of tiled evidential occupancy grid maps for the multi-vehicle mapping", Article, Nov. 23, 2018, retrieved from https://www.mdpi.com/1424-8220/18/12/4119/htm, 17 pages.
ArcGIS Pro, "Tiled processing of large datasets", Oct. 26, 2021, retrieved from https://pro.arcgis.com/en/pro-app/2.8/tool-reference/appendices/tiled-processing-of-large-datasets.htm, 6 pages.

* cited by examiner

*Primary Examiner* — Tiffany P Young
*Assistant Examiner* — Michael Tyler Evan Dowling
(74) *Attorney, Agent, or Firm* — DITTHAVONG, STEINER & MLOTKOWSKI

(57) ABSTRACT

A system, a method, and a computer program product may be provided for processing event data. For example, event data relating to an occurrence of an event corresponding to a first tile is received, and a first count value associated with the received event data is determined. A threshold count value associated with the event within the first tile is obtained, and dynamic switching between a link-based processing and a tile-based processing is performed, based on a comparison between the first count value and the threshold count value, wherein on determining the first count value to be greater than the threshold count value, the tile-based processing is performed, and on determining the first count value to be lesser than the threshold count value, the link-based processing is performed.

20 Claims, 8 Drawing Sheets

SYSTEM AND METHOD FOR PROCESSING EVENT DATA

TECHNOLOGICAL FIELD

The present disclosure generally relates to mapping and navigation systems, and more particularly relates to processing event data corresponding to an occurrence of an event in mapping and navigation systems.

BACKGROUND

Traffic flow prediction is an essential component of the intelligent transport system. The traffic flow estimation is significantly impacted by weather conditions. The weather conditions may impact the prediction of the traffic flow in different ways, such as vehicular speed, capacity, volume, safety of driver, human decisions regarding a trip and other factors relating to traffic. Moreover, weather conditions may also affect drivers' behavior by causing, for example, potential user frustration due to deterioration of the travel time and speeds, a state of panic in case of heavy traffic or hazardous weather conditions, and so forth.

Typically, a traffic management system collects data from one or more sensors onboard vehicles to analyze and predict traffic flow conditions and occurrence of any hazardous event. However, due to colossal amount of data received from vehicles during an occurrence of an event and complexity of the received data, a traffic management system may be prone to processing challenges due to heavy load and, in certain cases, failure of the system. Consequently, accurate and reliable reporting of time-sensitive information relating to the event may be affected under such heavy load and system failure.

BRIEF SUMMARY

A system, a method, and a computer program product are provided herein that focuses on processing event data. In one aspect, the system for processing event data may be provided. The system may include at least one non-transitory memory configured to store computer program code; and at least one processor (hereinafter referred as processor) configured to execute the computer program code to receive event data relating to an occurrence of an event corresponding to a first tile. In accordance with an embodiment, the processor may be configured to determine a first count value associated with the received event data related to the occurrence of the event. In accordance with an embodiment, the processor may be configured to obtain a threshold count value associated with the event within the first tile. In accordance with an embodiment, the processor may be configured to perform dynamic switching between a link-based processing and a tile-based processing, based on a comparison between the first count value and the threshold count value. In this regard, on determining the first count value to be greater than the threshold count value, the tile-based processing of the received event data is performed, and on determining the first count value to be lesser than the threshold count value, the link-based processing of the received event data is performed.

According to some example embodiments, the processor may be further configured to determine the threshold count value, based on a mean count associated with one or more historical occurrences of the event within the first tile.

According to some example embodiments, the processor may be further configured to perform the tile-based processing of the received event data relating to the occurrence of the event, on determining the first count value of the received event data to be greater than twice of the mean count of the one or more historical occurrences of the event.

According to some example embodiments, the processor may be further configured to determine a first time period corresponding to the occurrence of the event, and update map data corresponding to the first tile for the first time period to indicate the occurrence of the event. The first time period is determined based on the one or more historical occurrences of the event.

According to some example embodiments, the processor may be further configured to identify event data corresponding to each of one or more links within the first tile from the received event data, on determining the first count value to be lesser than the threshold count value. In accordance with an embodiment, the processor may be further configured to perform the link-based processing of the event data to update corresponding map data associated with the one or more links within the first tile.

According to some example embodiments, the processor may be further configured to determine a first time threshold and a first distance threshold for receiving subsequent event data, based on the first count value. In accordance with an embodiment, the processor may be further configured to set a limit on receiving the subsequent event data relating to the occurrence of the event corresponding to the first tile, based on the first time threshold and the first distance threshold.

According to some example embodiments, the processor may be further configured to receive the subsequent event data corresponding to the first tile, based on the first time threshold, and receive the subsequent event data corresponding to a first location and a second location within the first tile during a given time period, based the first distance threshold. The subsequent event data being received first time threshold apart from the received event data, and the second location being apart from the first location by the first distance threshold.

According to some example embodiments, the processor may be further configured to update a map database, based on the processing of the received event data.

According to some example embodiments, the event is a weather event.

Embodiments disclosed herein may provide a method for processing weather data. The method may include receiving weather data relating to an occurrence of a weather event from one or more vehicles within a first tile. The first tile comprises one or more links of a road network. The method may include determining a first count value corresponding to the first tile. The first count value is associated with the received weather data related to the occurrence of the weather event. The method may include obtaining a threshold count value associated with the weather event corresponding to the first tile. The method may include performing dynamic switching between a link-based processing and a tile-based processing, based on a comparison between the first count value and the threshold count value relating to the first tile. In particular, on determining the first count value to be greater than the threshold count value, the tile-based processing of the received event data is performed, and on determining the first count value to be lesser than the threshold count value, the link-based processing of the received weather data corresponding to the first tile is performed.

According to some example embodiments, the method may further include identifying weather data corresponding to each of the one or more links within the first tile from the received weather data, on determining the first count value to be lesser than the threshold count value. In accordance with an embodiment, the method may further include performing link-based processing of the received weather data corresponding to update corresponding map data associated with the one or more links within the first tile to indicate the occurrence of the weather event.

According to some example embodiments, the method may further include determining a first time threshold and a first distance threshold for receiving subsequent weather data corresponding to the first tile and setting a limit for receiving subsequent weather data corresponding to the first tile regarding the occurrence of the weather event, based on the first distance threshold and the first time threshold. The first time threshold and the first distance threshold are determined on determining that the first count value is greater than the threshold count value. The received weather data is received during a first time period and the subsequent weather data is received during a second time period.

According to some example embodiments, the method may further include receiving current weather data corresponding to the first tile during the first time period and receiving the subsequent weather data corresponding to the first tile during the second time period, wherein the second time period is first time threshold apart from the first time period.

According to some example embodiments, the method may further include receiving a first subsequent weather data corresponding to a first location within the first tile during the second time period and receiving a second subsequent weather data from a second location within the first tile during the second time period, wherein the second location is first distance threshold apart from the first location.

According to some example embodiments, the method may further include determining the threshold count value corresponding to the first tile, based on a mean count associated with one or more historical occurrences of the weather event within the first tile.

According to some example embodiments, the method may further include determining weather data corresponding to the first tile from the received weather data and determining a first time period corresponding to the occurrence of the weather event. The weather data corresponding to the first tile is determined on determining that the first count value of the received weather data is greater than twice of the mean count associated with the one or more historical occurrences. The first time period is determined based on the one or more historical occurrences of the weather event. The method further includes updating map data corresponding to the first tile for the first time period to indicate the occurrence of the weather event.

According to some example embodiments, the method may further include updating a map database, based on the processing of the received weather data.

Embodiments of the present disclosure may provide a computer programmable product including at least one non-transitory computer-readable storage medium having computer-executable program code stored therein. The computer programmable product comprising a non-transitory computer readable medium having stored thereon computer executable instructions, which when executed by a computer, cause the computer to carry out operations, for processing event data. The operations include receiving event data relating to an occurrence of an event from a first tile. The operations include determining a first count value associated with the received event data related to the occurrence of the event. The operations include obtaining a threshold count value associated with the event within the first tile. The operations include performing dynamic switching between a link-based processing and a tile-based processing, based on a comparison between the first count value and the threshold count value. In particular, on determining the first count value to be greater than the threshold count value, the tile-based processing of the received event data is performed, and on determining the first count value to be lesser than the threshold count value, the link-based processing of the received event data is performed. Further provided is a computer program product comprising instructions which, when the program is executed by a computer, cause the computer to carry out any of the steps described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
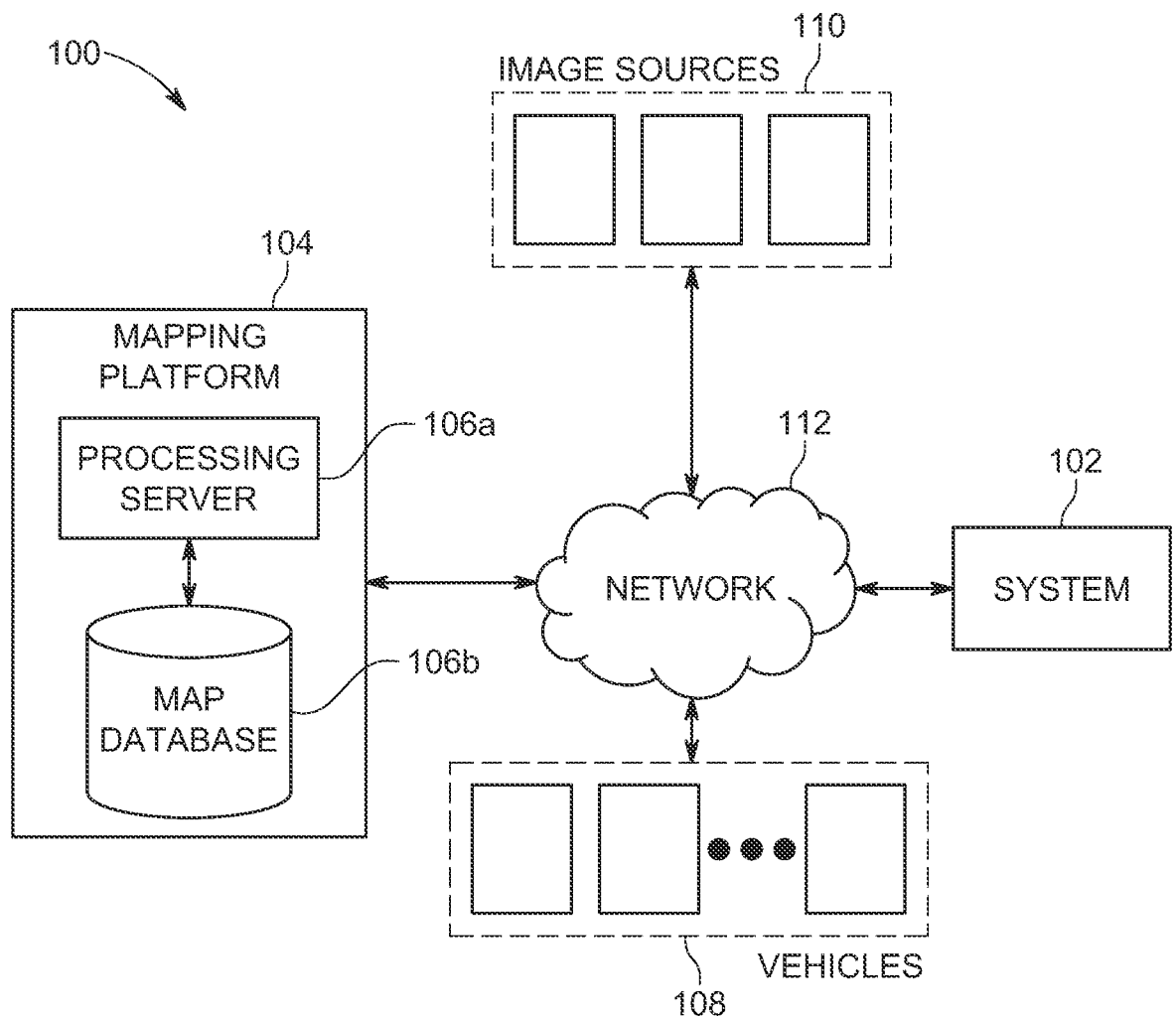
Figure 2A:
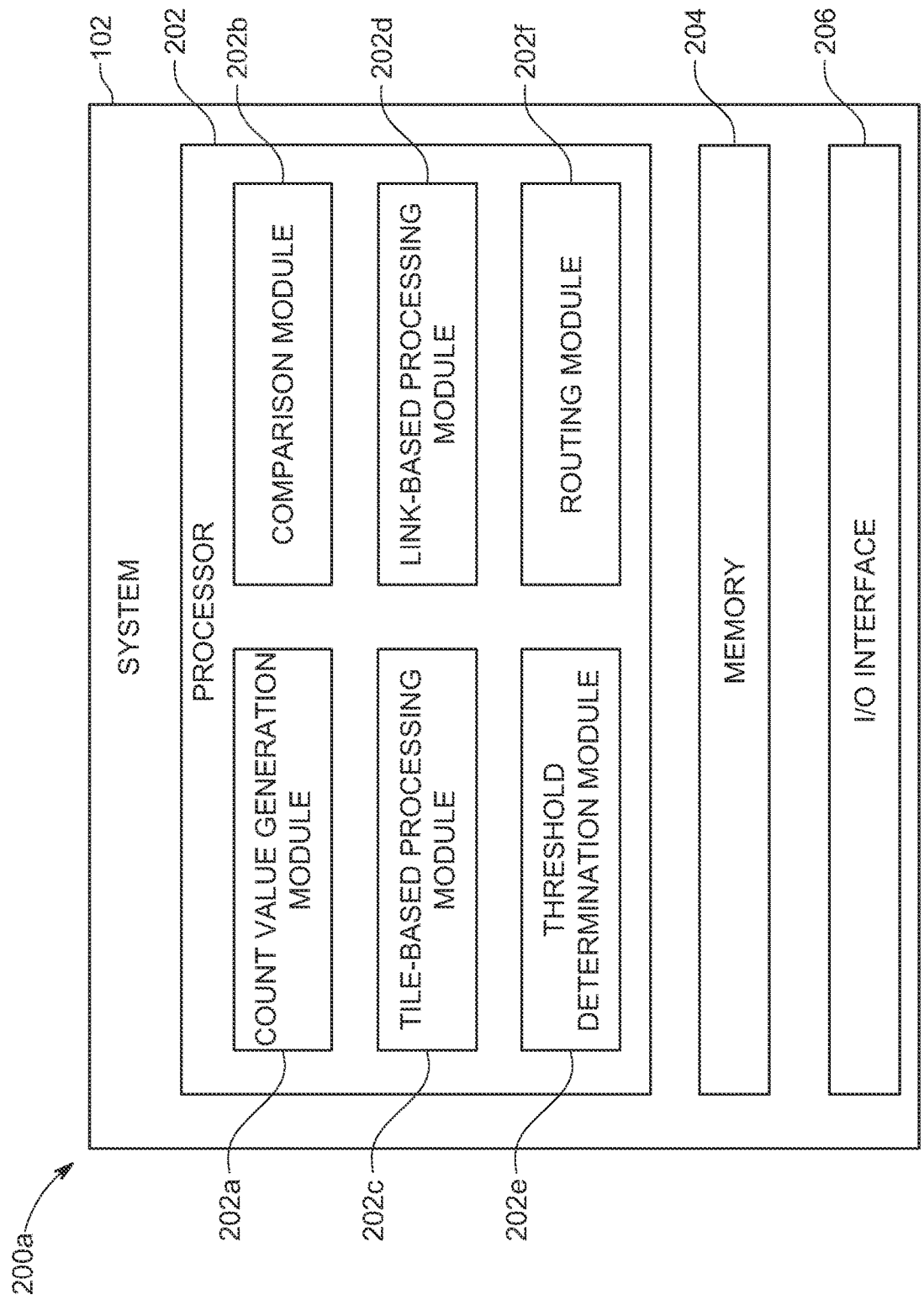
Figure 2B:
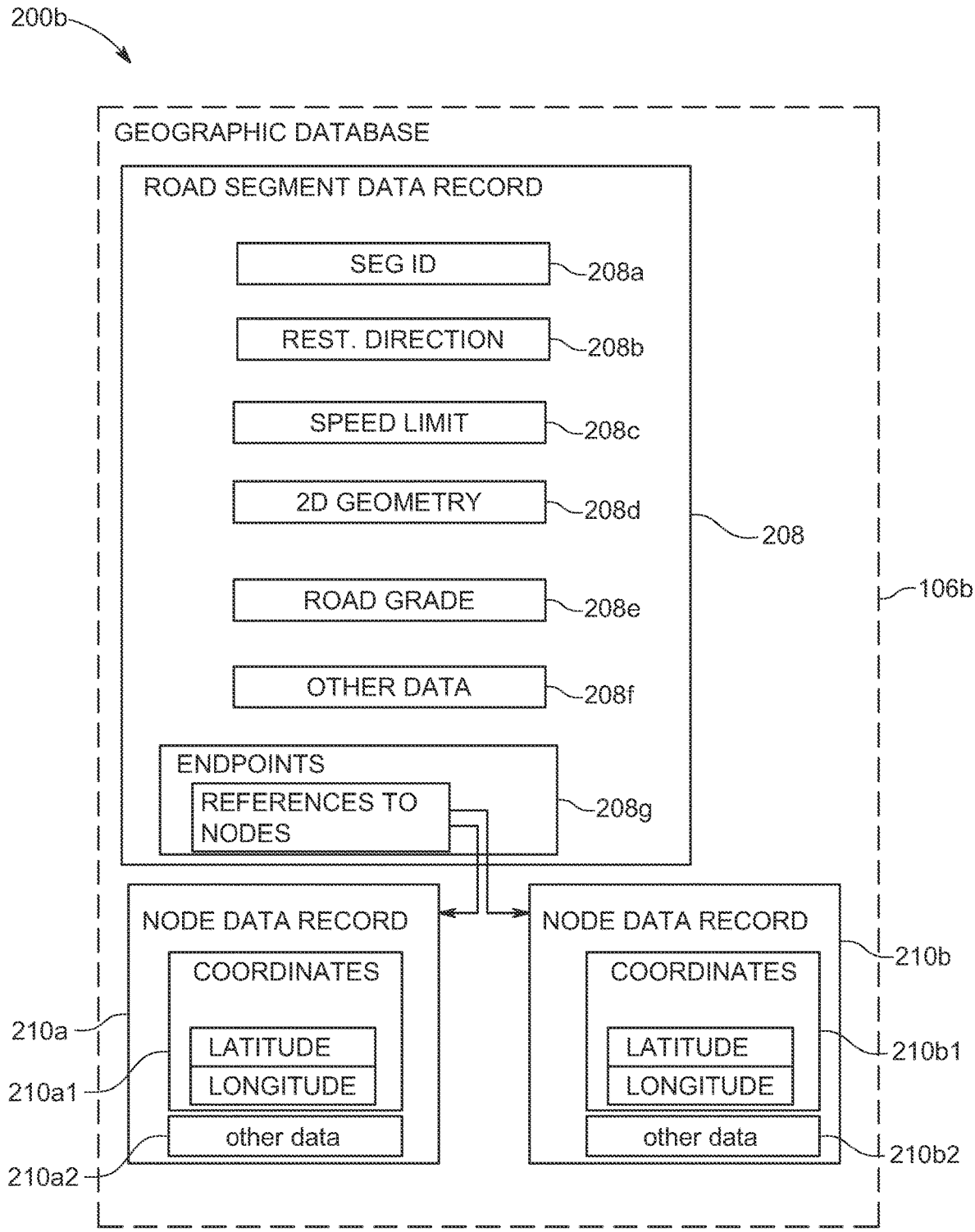
Figure 2C:
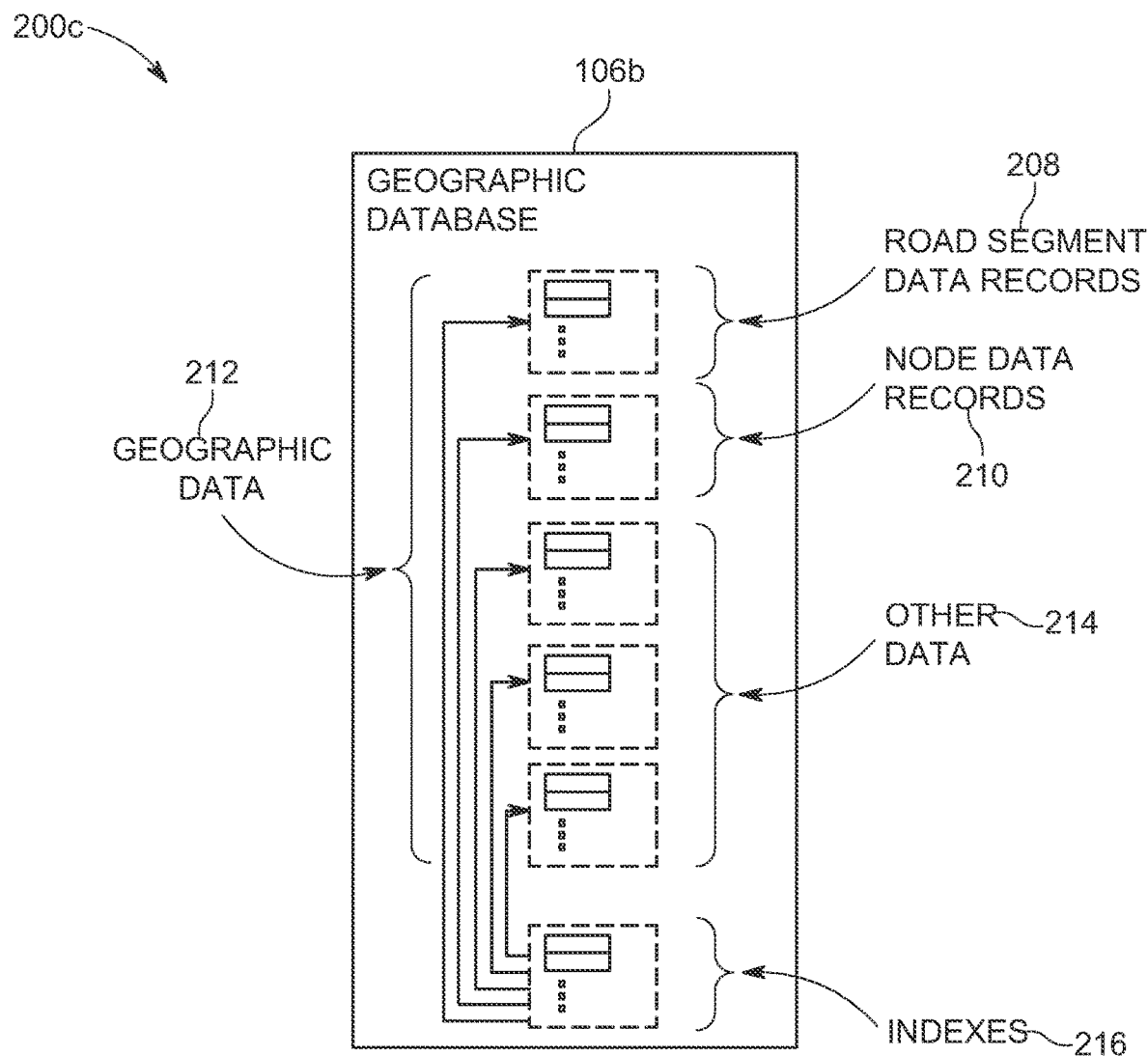
Figure 3:
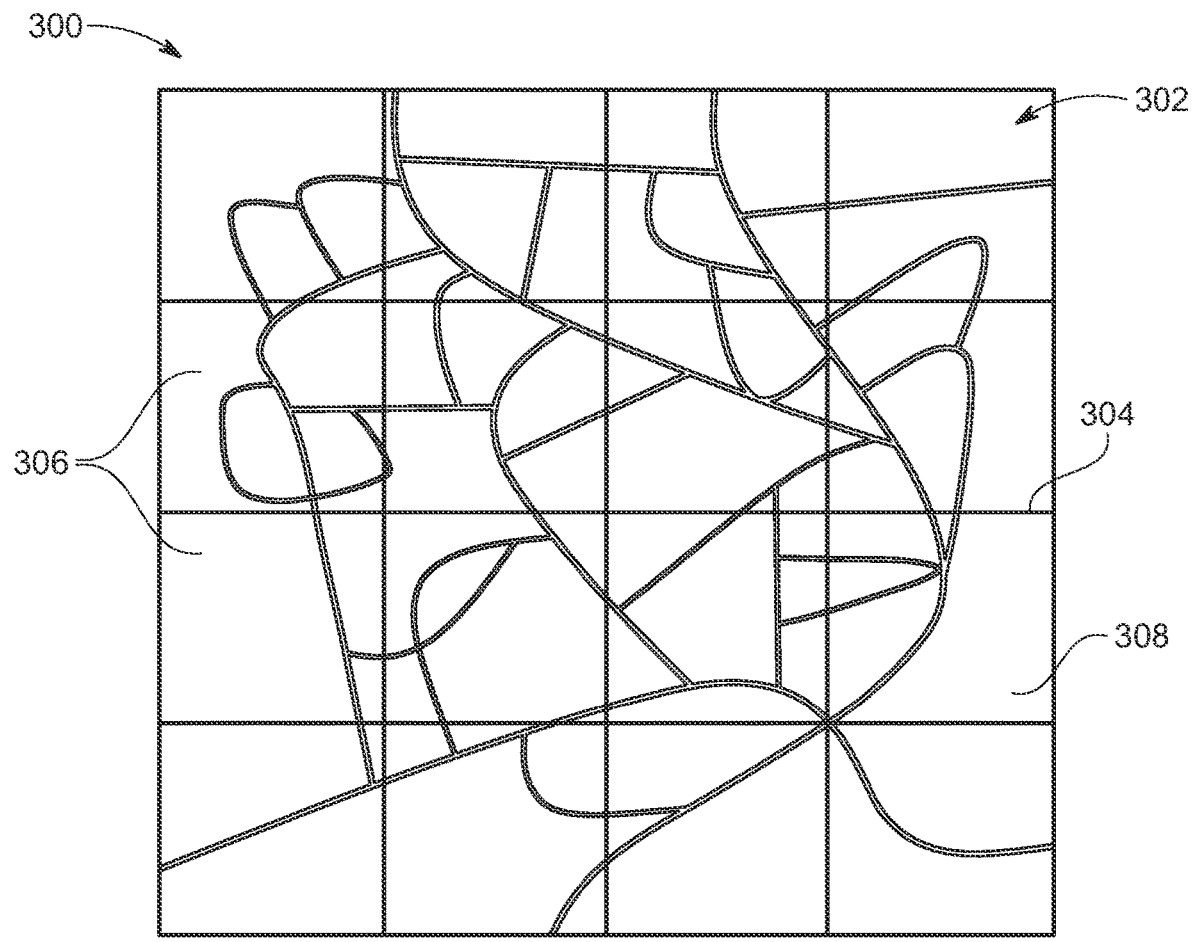
Figure 4:
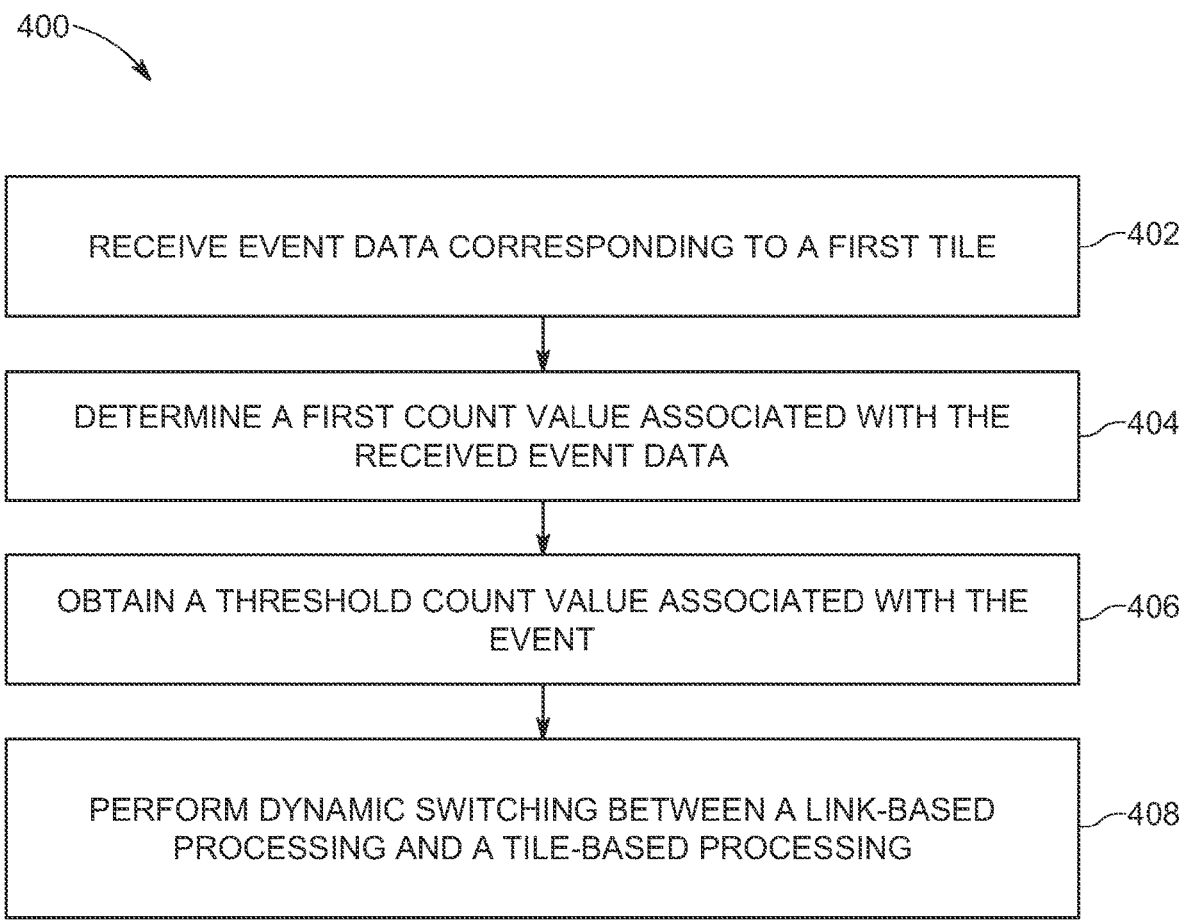
Figure 5:
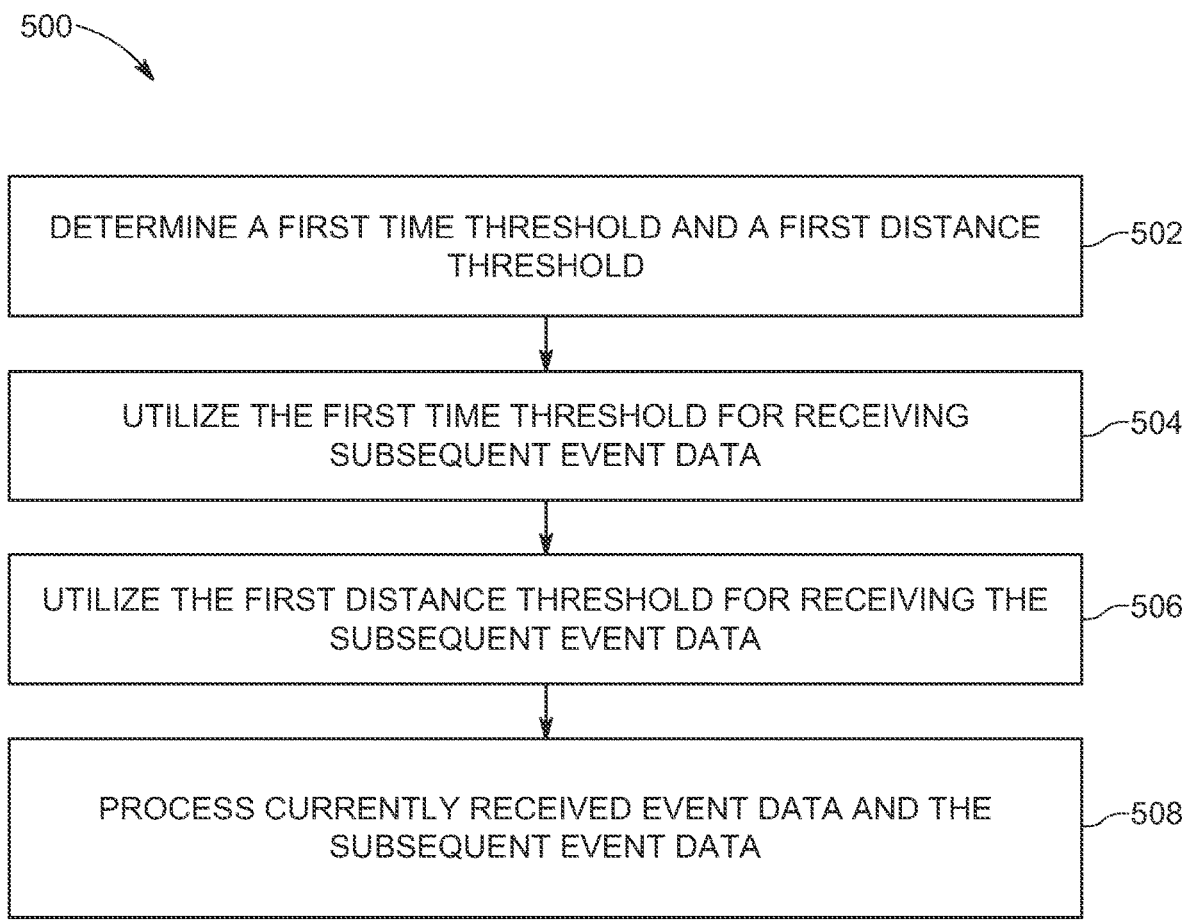
Figure 6:
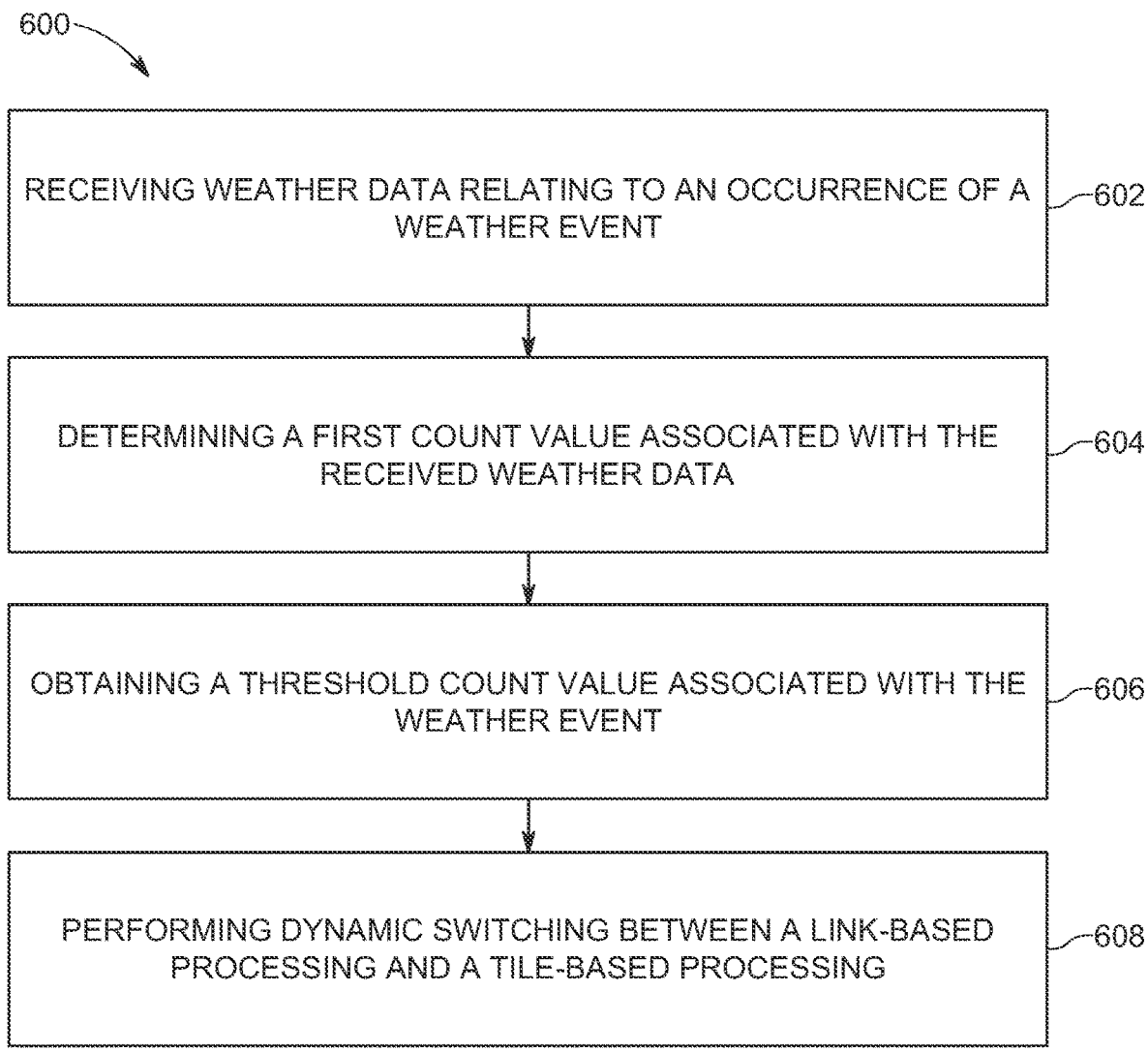

Having thus described example embodiments of the disclosure in general terms, reference will now be made to the accompanying drawings, which are not necessarily drawn to scale, and wherein:

FIG. 1 is a block diagram that illustrates a network environment of a system implemented for processing event data, in accordance with an example embodiment;

FIG. 2A illustrates a block diagram of a system for processing event data, in accordance with an example embodiment;

FIG. 2B illustrates an exemplary format of the map data stored in the map database, in accordance with an example embodiment;

FIG. 2C illustrates an exemplary map database storing map data for generating navigation instructions, in form of attributes shown in FIG. 2B, in accordance with an example embodiment;

FIG. 3 illustrates an example image of a geographical region used for tile-based processing, in accordance with an example embodiment;

FIG. 4 illustrates an example flowchart for implementation of a method to process event data, in accordance with an example embodiment;

FIG. 5 illustrates an example flowchart for implementation of an exemplary method to process event data, in accordance with an example embodiment; and FIG. 6 illustrates an example flowchart for implementation of a method to process weather data, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present disclosure. Thus, use of any such terms should not be taken to limit the spirit and scope of embodiments of the present disclosure.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "road" may refer to a way leading a traveler from one location to another. The road may have a single lane or multiple lanes.

The term "lane" may refer to a part of a road that is designated for travel of vehicles or pedestrians as per some condition.

The term "link" may refer to any connecting pathway including, but not limited to, a roadway, a highway, a freeway, an expressway, a lane, a street path, a road, an alley, a controlled access roadway, a free access roadway and the like.

The term "event" may refer to an incident or a phenomenon that has happened, is happening or will happen. Pursuant to present example, the event may refer to an incident that may happen on a road, or within a road network. In an example, the event may be a weather incident, such as snowstorm, slippery road, thunderstorm, dust storm, hail, high winds, wildfires, tornado, cyclones, earthquake, flood, and so forth. In certain cases, the event may also include construction work, roadblock, road closure, and the like. In an embodiment, the occurrence of the weather event may make it difficult and unsafe to drive for drivers in certain areas, such as certain part or parts of the road network. For example, the term "event" may be used interchangeably with a term "weather event".

The term "event data" may refer to data corresponding to an occurrence of an event. It may be understood that an event may occur several times over a period of time and may occur at different locations at a given time. The event data corresponding to an occurrence of the event may include information relating to the occurrence of event at a particular time and a particular location. In an embodiment, the event data may be acquired or collected from vehicles on the roads within the particular location. For example, one or more sensors onboard the vehicles may be configured to send event data, automatically or on satisfying certain trigger conditions, to a server for processing of such event data. In an example, the trigger conditions may be based on time, anomaly detection, threshold detection, and so forth. For example, the term "event data" may be used interchangeably with a term "weather data".

The term "tile" may refer to a particular area, for example, an area of land and/or water body, having definable characteristics. The tile may not have fixed boundaries. In an example, a tile may be homogenous in a selected defining criterion and may be different from neighboring tiles based on the defining criterion. In an example, a tile may be a portion of the surface of Earth. In an embodiment, a tile may correspond to a portion of a geographical area or a geographical region, where the geographical region may include one or more tiles. To this end, a tile may refer to a map tile which includes a part of a road network. In an example, geographic data associated with the geographic region may be organized into groupings. In this regard, data associated with each of the groupings may represent those geographic features that are contained in a separate, distinct one of a plurality of separate map tiles into which the entire represented geographic region is divided In an example, the map tile may be associated with a vehicle, wherein the map tile may correspond to an area within which the vehicle may exist and/or move. In certain cases, the map tile may also include information relating to places or areas that are neighboring to an area within which the vehicle exists or moves, and/or neighboring tiles. In an example, the tile may include a map tile with traffic flow, a transparent tile with only traffic flow, a base tile with traffic flow and without labels, and a tile with traffic flow and labels. The term "navigation instructions" may refer to one or more set of instructions for navigating from a source location to a destination location. For example, the navigation instructions may arrange a best possible way for travelling from the source location to the destination location depending on, for example, traffic conditions, road conditions, public vehicle options, private vehicle options, and so forth. In an example, the navigation instructions may also include textual instructions with all relevant navigation information, one or more flow or incident routing messages or alerts, estimated time of arrival (ETA) at the destination location, distance to travel, map icons, road information, traffic information along the route, and other settings and route-related information. In accordance with present disclosure, the navigation instructions may further include incident warning feature, such as warning message, and the like.

End of Definitions

A system, a method, and a computer program product are provided herein in accordance with an example embodiment for processing event data. The system, the method, and the computer program product disclosed herein enables processing of large quantities of complex event data received from multiple vehicles during an occurrence of an event in an efficient manner. Specifically, the system, the method, and the computer program product disclosed herein performs processing of large quantities of the event data to filter certain event data and provide accurate warning.

The system, the method, and the computer program product disclosed herein may be configured to detect an occurrence of an event in an area and report road conditions in that area. The system, the method, and the computer program product disclosed herein may be configured to determine a threshold count value based on historical occurrences of the event to set a limit or filter for receiving subsequent event data. The system, the method, and the computer program product disclosed herein are further configured to enable processing of such filtered event data in order to continuously monitor the occurrence of the event within a tile and predict and update road conditions corresponding to the occurrence of the event in the tile. The system, the method, and the computer program product disclosed herein may reduce an amount of input data for processing and estimation. In an example, the system, the method, and the computer program product disclosed herein reduces the amount of input data by switching from link-based processing of input event data to tile-based processing. The aggregation of massive amount of event data in different groups for tile-based processing in accordance with a tile ensures that data is processed efficiently. In addition, the tile-based processing of a tile area enables prediction of road conditions within the tile area for which explicit event data is not available.

The system, the method, and the computer program product disclosed herein may be configured to update the map data based on the processing of filtered event data. The system, the method, and the computer program product disclosed herein may update tile area, based on the occurrence of the event to ensure safety of driver. The system, the method, and the computer program product disclosed herein may further provide a warning, an alert or a notification indicating the occurrence of the event. These and other technical improvements of the present disclosure will become evident from the description provided herein.

FIG. 1 is a block diagram that illustrates a network environment 100 of a system 102 implemented for processing event data, in accordance with an example embodiment. As shown in FIG. 1, the network environment 100 may include the system 102, and a mapping platform 104. The mapping platform 104 may further include a processing server 106a and a map database 106b. The network environment 100 may further include vehicles 108, image sources 110, and a network 112. The vehicles 108 may include one or more sensors, a user equipment and/or a communication interface (not shown in the FIG. 1). Additional, fewer, or different components may be provided. For example, a proxy server, a name server, a map server, a cache server or cache network, a router, a switch or intelligent switch, a geographic database, additional computers or workstations, administrative components, such as an administrative workstation, a gateway device, a backbone, ports, network connections, and network interfaces may be provided. While the components in FIG. 1 are shown as separate from one another, one or more of these components may be combined. In this regard, the system 102 may be communicatively coupled to the components shown in FIG. 1 to carry out the desired operations and wherever required modifications may be possible within the scope of the present disclosure.

In some example embodiments, the image sources 110 may be a website, an application, a program, a workstation or computer, a file, a memory, a server, a beacon or map beacon, a repository, and/or any other hardware and/or software component or database that can store or include images or data associated with images. Alternatively, the image sources 110 are one or more images. In one embodiment, the image sources 110 include one or more images of tiles, such as a first tile within a geographic region. The images are raster or pixel based images, such as a JPEG, Bitmap, Pixmap, Tiff, or other pixel or raster based file format. The images may be vector based or vectorized images.

In accordance with an embodiment, tiles may correspond to real-world geographical areas in which a person, a pedestrian, a vehicle, or people walk and/or move about. The tiles may also correspond to future real-world areas that have not been built yet. Alternatively, the tiles may correspond to imaginary locales, settings, or areas. The tiles may also represent an unorganized or unconstrained geographic area. For example, a tile layout is an area in which a pedestrian or a vehicle is not limited to travel only on a set road or path network.

The images of the tiles may include images of, for example, satellite view of the tiles, terrain view of the tiles, map view of the tiles, real-world building point of interest structures in the tiles, road network in the tiles, and exterior area plans corresponding to places where a vehicle can move in the tiles. In an example, the images are pre-existing or publicly available images. For example, the images are originally formed or created for purposes other than generating a routable map. The pre-existing images may be generated by an entity separate from a developer of a warning map and/or its end user. The pre-existing images are available to the public or an entity for free or for a purchase price (e.g., online). Alternatively, self-generated images, images originally generated for creating a routable map, or non-public images may be used.

The image sources 110 are in communication with the system 102 and the mapping platform 104, via the network 112.

In some example embodiments, system 102 may be coupled to the vehicles 108, via user equipment. In an embodiment, the system 102 may be coupled to one or more user equipment, for example, as a part of an in-vehicle navigation system, a navigation app in a mobile device and the like. The user equipment may be any user accessible device such as a mobile phone, a smartphone, a portable computer, and the like that are portable in themselves or as a part of another portable/mobile object such as the vehicles 108. The user equipment may comprise one or more sensors, a processor, a memory, and a communication interface. The processor, the sensors, the memory, and the communication interface may be communicatively coupled to each other. In some example embodiments, the user equipment is associated, coupled, or otherwise integrated with the vehicles 108 as, for example, an advanced driver assistance system (ADAS), a personal navigation device (PND), a portable navigation device, an infotainment system and/or other device that may be configured to provide route guidance and navigation related functions to users. For example, the user equipment may be configured to execute and run mobile applications such as a messaging application, a browser application, a navigation application, and the like.

In some example embodiments, the vehicles 108 may include processing means such as a central processing unit (CPU), storage means such as on-board read only memory (ROM) and random access memory (RANI), acoustic sensors such as a microphone array, position sensors such as a GPS sensor, gyroscope, a LIDAR sensor, a proximity sensor, motion sensors such as accelerometer, an image sensor such as camera, a display enabled user interface such as a touch screen display, and other components as may be required for specific functionalities of the vehicles 108.

In one embodiment, the vehicles 108 may be directly coupled to the system 102 via the network 112. In another embodiment, the vehicles 108 may be coupled to the system 102 via an OEM (Original Equipment Manufacturer) cloud and the network 112. For example, the vehicles 108 may be consumer vehicles and may be a beneficiary of the services provided by the system 102. In some example embodiments, the vehicles 108 may serve the dual purpose of data gatherers and beneficiary devices. In an example, the vehicles 108 may be configured to detect road conditions, vehicle conditions and traffic conditions on links and/or road segments by using sensors that are on-board the vehicles 108. In another example, the user equipment within the vehicles 108 may be configured to gather sensor data using sensors on-board the vehicles 108 and sensors of the user equipment. The user equipment then sends the detected data to the system 102, which processes the detected data to process event data, report anomalous events and generate and update navigation instructions.

In some example embodiments, the vehicles 108 may generate event data as part of sensor data on detecting certain hazardous or anomalous conditions. In accordance with an embodiment, the event data may be generated by the vehicles 108, when sensor(s) on-board the vehicles 108 may sense that anomalous conditions are met or satisfied. In accordance with an embodiment, the anomalous conditions may be pre-defined based on, for example, low or reduced visibility, fog, accidents, broke down vehicles, heavy rains, snowstorms, or any other obstructions on roads for vehicular movements (such as, water, debris, and so forth). The vehicles 108 may generate the event data in real-time and transmit it to the system 102 and/or the mapping platform 104 to report the anomalous condition. In certain cases, the vehicles 108 may be configured to send updated event data periodically, for example, every five seconds, every thirty seconds, every minute, and so forth, in case of detection of anomalous conditions.

In an example embodiment, the system 102 may be onboard the vehicles 108, such as the system 102 may be a navigation system installed in the vehicles 108 for processing event data, reporting event, and generating and/or updating road conditions and navigation instructions. In an example, the vehicles 108 may be an autonomous vehicle, a semiautonomous vehicle, or a manually operated vehicle. In another example embodiment, the system 102 may be the processing server 106a of the mapping platform 104, and therefore may be co-located with or within the mapping platform 104. For example, the system 102 may be embodied as a cloud based service, a cloud based application, a cloud based platform, a remote server based service, a remote server based application, a remote server based platform, or a virtual computing system. In yet another example embodiment, the system 102 may be an OEM (Original Equipment Manufacturer) cloud. The OEM cloud may be configured to anonymize any data received by the system 102, such as from the user equipment or the vehicles 108, before using the data for further processing, such as before sending the data to map database 106b. In an example, anonymization of the data may be done by the mapping platform 104.

The system 102 may be communicatively coupled to the vehicles 108, the image sources 110, and the mapping platform 104, via the network 112. In an embodiment, the system 102 may be communicatively coupled to other components, for example, user equipment, and so forth, not shown on FIG. 1 via the network 112. The network 112 may be wired, wireless, or any combination of wired and wireless communication networks, such as cellular, Wi-Fi, internet, local area networks, or the like. In some embodiments, the network 112 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

All the components in the network environment 100 may be coupled directly or indirectly to the network 112. The components described in the network environment 100 may be further broken down into more than one component and/or combined together in any suitable arrangement. Further, one or more components may be rearranged, changed, added, and/or removed.

The system 102 may comprise suitable logic, circuitry, and interfaces that may be configured to process event data for reporting occurrence of the event and generating and/or updating road conditions and navigation instructions. The system 102 may be configured to receive event data relating to an occurrence of an event corresponding to a first tile. In an example, the first tile may include a one or more portions of one or more roads, or one or more link of a road network. In an example, the system 102 may receive the event data from vehicles 108, wherein the vehicles 108 may exist or move within the first tile. In another example, the vehicles 108 may transmit the event data to the mapping platform 104. In such a case, the system 102 may query the mapping platform 104 to retrieve the event data. In an example, the event data may relate to the occurrence of a weather event in the first tile.

The mapping platform 104 may comprise suitable logic, circuitry, and interfaces that may be configured to store one or more map attributes associated with road network. The mapping platform 104 may be configured to store and update map data indicating the map attributes, in the map database 106b. The mapping platform 104 may include techniques related to, but not limited to, geocoding, routing (multimodal, intermodal, and unimodal), clustering algorithms, machine learning in location based solutions, natural language processing algorithms, and artificial intelligence algorithms. Data for different modules of the mapping platform 104 may be collected using a plurality of technologies including, but not limited to drones, sensors, connected cars, cameras, probes, and chipsets. In some embodiments, the mapping platform 104 may be embodied as a chip or chip set. In other words, the mapping platform 104 may comprise one or more physical packages (such as, chips) that includes materials, components and/or wires on a structural assembly (such as, a baseboard).

In some example embodiments, the mapping platform 104 may include the processing server 106a for carrying out the processing functions associated with the mapping platform 104 and the map database 106b for storing map data and event data. In an embodiment, the processing server 106a may comprise one or more processors configured to process requests received from the system 102. The processors may fetch event data and/or map data from the map database 106b and transmit the same to the system 102 in a format suitable for use by the system 102. In some example embodiments, as disclosed in conjunction with the various embodiments disclosed herein, the system 102 may be used to process the event data for updating road conditions and generating navigation instructions using the event data, map data and images corresponding to the first tile.

Continuing further, the map database 106b may comprise suitable logic, circuitry, and interfaces that may be configured to store event data and map data, which may be collected from vehicles 108 traveling on a link on a route in the first tile, or on another tile associated with the first tile. In an example, the mapping platform 104 may receive the event data and fuse the event data to infer event-related information and road conditions associated with the first tile in which probes or fleeting vehicles 108 are moving. In accordance with an embodiment, such event data may be updated in real time or near real time such as within a few seconds, a few minutes, or on hourly basis, to provide accurate and up to date data. The event data may be collected from any sensor that may inform the mapping platform 104 or the map database 106b of features within an environment of the first tile that are appropriate for traffic related services or mapping services. For example, motion sensors, inertia sensors, image capture sensors, proximity sensors, LIDAR (light detection and ranging) sensors, and ultrasonic sensors may be used to collect the event data. The gathering of large quantities of crowd-sourced data may facilitate the accurate modeling and mapping of an environment of the first tile.

In accordance with an embodiment, the map database 106b may be configured to receive, store, and transmit the event data that may be collected from consumer vehicles 108 travelling on links throughout a geographic area (or the first tile), or along a route passing through the first tile. In accordance with another embodiment, a map developer may employ field personnel to travel by a vehicle along links throughout the first tile to observe features and/or record information, such as event data and map data. The map developers may crowd source geographic map data (or the map data) and event data to accurately process such event data, report the event, determine road conditions, and generate or update navigation instructions. In accordance with an embodiment, the event data may include, but not limited to, vehicle condition information, road sign information, lane marking information, pedestrian image, image of surrounding environment of the vehicle, time stamp, road condition image and/or information, and geolocation data.

In some example embodiments, the map database 106b may also be configured to receive, store, and transmit other sensor data and probe data including positional, speed, and temporal data received from the vehicles 108. The probe data may be used to determine anomalies on the plurality of links in the first tile. In accordance with an embodiment, the probe data may include, but are not limited to, real time speed (or individual probe speed), road condition data, incident data on the road, road closure and construction data, traffic signal timing data, geolocation data, timestamp data, and historical recurring traffic congestion pattern data.

The map database 106b may further be configured to store the traffic-related data and road topology and geometry-related data for a road network as map data. The map data may also include cartographic data, routing data, and maneuvering data. The map data may also include, but not limited to, locations of intersections, diversions to be caused due to the heavy congestion, suggested roads, or links to avoid heavy congestion, ETAs depending on different links. In accordance with an embodiment, the map database 106b may be configured to receive the map data including the traffic-related attributes and the road topology and geometry-related attributes related to the road network from external systems, such as, one or more of background batch data services, streaming data services, image sources 110, and third party service providers, via the network 112.

In some example embodiments, the images received from the image sources 110 may be stored within the map database 106b of the mapping platform 104. In certain cases, the mapping platform 104, using the processing server 106a, may suitably process the received images. For example, such processing may include, suitably labeling the images based on corresponding associated tiles, point of interests within the tiles and other information relating to respective tiles. Such labeled images may then be stored within the map database 106b as map data.

In some embodiments, the map database 106b may further store historical event data for occurrences of events (such as, but not limited to, road incidents, construction activities, scheduled events, unscheduled events, and weather and disaster events), and Point of Interest (POI) data records or other records of the map database 106b.

For example, the data stored in the map database 106b may be compiled (such as into a platform specification format (PSF)) to organize and/or processed for identifying and updating road conditions during an occurrence of an event in the first tile, and generate or update navigation-related functions and/or services, such as route calculation, route guidance, map display, speed calculation, distance and travel time functions, navigation instruction generation, and other functions, by a navigation device, such as a user equipment or UE. The navigation-related functions may correspond to vehicle navigation, pedestrian navigation, navigation to a favored parking spot, navigation to a safe spot in case of a weather event, and other types of navigation. While example embodiments described herein generally relate to vehicular travel, example embodiments may be implemented for bicycle travel along bike paths, boat travel along maritime navigational routes, etc. The compilation to produce the end user databases may be performed by a party or entity separate from the map developer. For example, a customer of the map developer, such as a navigation device developer or other end user device developer, may perform compilation on a received map database 106b in a delivery format to produce one or more compiled navigation databases.

In some embodiments, the map database 106b may be a master geographic database configured on the side of the system 102. In accordance with an embodiment, a client-side map database may represent a compiled navigation database that may be used in or with end user devices (e.g., user equipment onboard the vehicles 108) to process event data during the occurrence of the event in the first tile and provide navigation instructions, and/or map-related functions to navigate through the one or more links in the first tile.

Optionally, the map database 106b may contain lane and intersection data records or other data that may represent one or more links in the first tile, pedestrian lane, or areas in addition to or instead of the vehicle road record data. The lanes and intersections may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, and parks. The map database 106b may additionally include data about places, such as cities, towns, or other communities, and other geographic features such as, but not limited to, bodies of water, and mountain ranges.

In case of modern day navigation services for providing navigation instructions, it becomes critical to deliver important targeted information about potential road hazards, accidents, and potentially unsafe driving conditions to drivers of the vehicles 108 in real-time. In accordance with an embodiment, several sensors onboard of a large number of connected vehicles, such as the vehicle 108, are configured to send event data that may indicate an occurrence of a weather event or an event affecting road conditions within the first tile. For example, a large number of vehicles from the first tile may report the occurrence of the event by sending the event data automatically, and in certain cases, periodically. In an example, an on-board modem or on-board user equipment may be configured to gather required event data and report the occurrence of the event by sending the event data in real-time.

However, owing to complexity associated with the event data and large quantities of such event data received from each of the vehicles 108 probing or travelling within the first tile, processing of such event data may be affected. In particular, at a time of occurrence of the event, large number of vehicles 108 may start reporting the event and sending the event data repeatedly. Subsequently, a large amount of computational resources may be required for processing such event data. Moreover, owing to dynamic road and traffic conditions, it may not be possible to reliably predict a quantity of event data that may be received, thereby making allocation of pre-defined computational resources ineffective.

In particular, a system for processing the event data may get overloaded and, in certain cases, may fail. Due to such system failure, reporting of the event may be hampered. Moreover, this may affect updating of road conditions and generation of navigation instructions based on occurrence of the event.

In certain cases, it may be crucial to report the event to ensure enhanced driver safety and informed decision making. Moreover, it may be crucial to have road information corresponding to one or more tiles that are experiencing the occurrence of the event, to travel through one or more links and roads within such tiles and avoid incidents, wherever possible. Therefore, it becomes crucial to reliably process event data and provide information relating to the occurrence of the event (or hazard). In accordance with an embodiment of the present disclosure, on identifying an occurrence of the event within a tile, such as the first tile, and on receiving large quantities of the event data from the first tile, a tile-based processing may be performed on the received event data corresponding to the first tile. This may prevent overburdening of the system and may further prevent instances of system failure due to large quantities of event data reported during the occurrence of the event. Advanced planning and coordination based on the reported occurrence of the event may allow drivers to avoid any unsafe driving condition and develop and deploy optimal operational strategies.

The embodiments disclosed herein addresses the aforementioned problems relating to conventional map updating techniques for anomalies warning. The embodiments disclosed herein reliably processes event data under heavy load during the occurrence of the event, based on the tile-based processing, while ensuring that quality of information provided by the navigation system, or the anomalies warning system is maintained.

In operation, the system 102 may be configured to receive event data associated with the occurrence of the event in the first tile. In an example, the event data may be received from the vehicles 108. Examples of the vehicles 108 may include, but are not limited to, a bus, a taxi, a two-wheeler, a three-wheeler, and a car. In accordance with an embodiment, boundaries associated with the first tile may be pre-defined. In accordance with another embodiment, the determination of the first tile, i.e., boundaries of the first tile, may also be initiated autonomously by the system 102, based on the received event data. In accordance with an embodiment, any machine learning technique (such as, deep machine learning technique) may be used to identify the vehicles 108 travelling on one or more links within the first tile. In some example embodiments, the system 102 may retrieve the event data from the map database 106b, or by querying the processing server 106a. In some example embodiments, the system 102 may communicate directly with the vehicles 108, for example, via the network 112 and/or the mapping platform 104, to receive the event data. In this regard, the event data may also be stored in the map database 106b.

In an example, the system 102 may determine a first count value associated with the received event data related to the occurrence of the event. In accordance with an embodiment, the first count value may be determined based on a number of different vehicles reporting the occurrence of the event by sending the event data from the first tile. In accordance with another embodiment, the first count value may be determined based on a number of vehicles reporting the occurrence of the event within a pre-defined time period.

The system 102 may be further configured to obtain a threshold count value associated with the occurrence of the event. In an example, the threshold count value corresponding to the event may be stored within the map database 106b. In an example, the threshold count value may be pre-determined based on a mean count of historical event data reported during one or more historical occurrences of the event. In certain cases, the threshold count value may be determined based on the mean count of the historical occurrences of the event in various regions, for example, different tiles within a state, a country, and so forth. In certain cases, the determination of the threshold count value may be initiated autonomously by the system 102, based on the mean count of historical occurrences of the event within the first tile and/or other tiles associated with the first tile where the event has occurred.

Further, the system 102 may be configured to perform dynamic switching between a link-based processing and a tile-based processing, based on a comparison between the first count first count value and the threshold count value. To that end the dynamic switching comprises choosing one of the two processing options, that is link-based processing or tile-based processing, based on conditions prevalent at the time of processing or in certain time period during which event data is being received. Link-based processing comprises processing the event data and updating the map data for each link of the first tile separately, while tile-based processing comprises processing the event data and updating the map data for the entire first tile. In this regard, the system 102 may be configured to compare the first count value with the threshold count value. Further, the system 102 may be configured to select a type of processing, i.e., link-based processing or tile-based processing, to be performed on the received event data. In an example, the system 102 may perform such dynamic switching based on the comparison in order to suitably manage load of processing of event data.

It may be noted that a plurality of links and roads of a road network may lie within the first tile, wherein the vehicles 108 may be moving within the first tile. Further, the system 102 may identify occurrence of the event within the first tile and a potential system overload due to large quantities of reports or event data received corresponding to the occurrence of the event. Subsequently, the system 102 may switch to tile-based processing in cases where the first count value of the received event data is greater than the threshold count value. In accordance with an embodiment, in a case where the first count value is lesser than the threshold count value, the system 102 may perform link-based processing of the received event data.

In accordance with an embodiment, the system 102 may be configured to perform the tile-based processing of the received event data corresponding to the first tile, on determining the first count value is greater than the threshold count value. In this regard, the first count value being greater than the threshold count value may indicate that large quantity of event data is received and therefore load of processing is high. Subsequently, switching a mode of processing of such large quantity of event data to tile-based processing may reduce the number of event data to be processed for determining road conditions or any event related condition within the first tile. For example, while performing the tile-based processing, some of the event data from the received event data may have to be processed. For example, the some of the event data may correspond to certain specific coordinates or locations, such as along boundary of the first tile, location corresponding to certain points of interests within the first tile, and other specific locations, associated with the first tile. Moreover, during tile-based processing, processing operations, such as map matching, may not be performed. Owing to reduced number of event data to be processed and such tile-based processing, the processing load may reduce substantially.

In accordance with an embodiment, on determining the first count value to be lesser than the threshold count value, the link-based processing of the received event data is performed. For example, a link may represent a portion of a road, such as by dividing a given physical road into multiple links. For example, each link might be a particular length, such as a one-mile length of the road or 200-foot length of the road, or instead some such links may correspond to particular road features (e.g., to represent an intersection or other junction of multiple roads with a particular link). Such links may be defined, for example, by governmental or private bodies that create maps (e.g., by a government standard; by commercial map companies as a quasi-standard or de facto standard; etc.) and/or by a provider of the DBA and/or RS systems, such that a given road may be represented with different links by different entities. For example, the link-based processing of the links within the first tile may include map matching and integrating event data and other traffic information on link basis and/or lane-by-lane basis, to determine point-to-point navigation instructions. For example, based on link-based processing of the event data for the first tile, color-coded traffic flow information corresponding to each link may be used to provide traffic or incident flow information and indicate the occurrence of the event on the links.

In accordance with an embodiment, the system 102 may be further configured to report the occurrence of the event in the first tile, for example, as warning message or warning notification, as part of navigation instructions and routing instructions. The system 102 may further be configured to update the map database 106b, based on the received event data to indicate the occurrence of the event in the first tile, the determined first count value and other road condition information determined based on the link-based processing or tile-based processing of the event data. In an example, the system 102 may further generate updated navigation instructions for navigating within the first tile during the occurrence of the event. For example, the updated navigation instruction may include warning message, updated road conditions, and other navigation information.

FIG. 2A illustrates a block diagram 200a of the system 102, exemplarily illustrated in FIG. 1 that may be used for processing event data, in accordance with an example embodiment. FIG. 2A is explained in conjunction with FIG. 1.

The system 102 may include at least one processor 202, a memory 204, and an I/O interface 206. The at least one processor 202 may comprise modules, depicted as a count value generation module 202a, a comparison module 202b, a tile-based processing module 202c, a link-based processing module 202d, a threshold determination module 202e and a routing module 202f.

In accordance with an embodiment, the system 102 may store data that be generated by the modules while performing corresponding operation or may be retrieved from a database associated with the system 102. In an example, the data may include event data, sensor data, map data, probe data, a first count value, a threshold count value, warning message, and navigation instructions.

The count value generation module 202a may be configured to determine the first count value associated with the received event data relating to the occurrence of the event in the first tile. In accordance with an embodiment, the first count value may be determined based on a number of times event data is received from same or different vehicles within the first tile within a defined time period (such as in one second, in five seconds, in 30 seconds, and so forth), or based on a total number of times the event data is received from same or different vehicles within the first tile. In accordance with an embodiment, the count value generation module 202a may determine the first count value repeatedly, for example, after every 5 seconds, every 30 seconds, every minute, every 2 minutes, every 5 minutes, and so forth. In this manner, the count value generation module 202a may continuously determine updated first count value during a time period when the system 102 is receiving the event data indicating the occurrence of the event.

The threshold determination module 202e may be configured to determine the threshold count value based on historical occurrences of the event. In accordance with an embodiment, the threshold determination module 202e retrieve historical data corresponding to historical occurrences of the event from a map database, such as the map database 106b. The historical data may indicate a number of times event data was received or reported during a corresponding historical occurrence. Based on count of event data reported during each of the historical occurrences, a mean count associated with the historical occurrences of the event may be determined. In an example embodiment, the threshold count value may be determined to be twice of the mean count. In an example embodiment, the threshold count value may be user defined.

In an example, the threshold determination module 202e may determine the mean count based on historical occurrences of the event within the first tile. In another example, the threshold determination module 202e may determine the mean count based on historical occurrences of the event within the first tile as well as other regions or tiles, such as tiles neighboring to the first tile, tiles within other parts of a state or a country associated with the first tile where the event has occurred, other tiles having similar layout where the event has occurred, and the like.

In accordance with an embodiment, the threshold determination module 202e may generate the threshold count value corresponding to the event and store the same in the map database 106b. Subsequently, the threshold count value may be retrieved from the map database 106b for faster processing of event data. In accordance with another embodiment, the threshold determination module 202e may determine the threshold count value in real-time, for example, when the system 102 starts to receive the event data corresponding to the occurrence of the event in the first tile.

Further, the comparison module 202b may be configured to compare the first count value with the threshold count value. In an example, the comparison module 202b may be configured to repeatedly compare the generated first count value with threshold count value, for example, whenever an updated first count value is generated. Based on an output of the comparison module 202b, either of the tile-based processing module 202c or link-based processing module 202d may be triggered.

Based on the output of the comparison module 202b, dynamic switching between the tile-based processing module 202c for tile-based processing of the received event data and link-based processing module 202d for link-based processing of the received event data may be performed.

In an example, the tile-based processing module 202c may be configured to perform tile-based processing of the received event data when the comparison module 202b determines that the first count value is greater than the threshold count value. For example, the threshold count value may correspond to twice of the mean count of the historical occurrences of the event. Subsequently, on determining the first count value of the received event data to be greater than twice the mean count of the historical occurrences of the event, tile-based processing on the received event data may be performed.

In an example, boundaries corresponding to the first tile within a corresponding geographical region may be defined. In another example, the boundaries corresponding to the first tile be determined dynamically, for example, based on a count associated with received event data, i.e., the first count value. In an example, when very large number of event data may be received, tile area corresponding to the first tile may be smaller to process event data without loss. Alternatively, when smaller number of event data may be received, tile area corresponding to the first tile may be larger.

Based on the tile-specific event data, tile-based processing of received event data may be performed. In this manner, road information of one or more links within the first tile may be updated. During tile-based processing, traffic processing on link basis, such as map matching, and the like, may be avoided. Moreover, the tile-based processing may include processing event data corresponding to certain specific coordinates or locations of the tile(s), thereby averting processing of each of the received event data that may cause overload or system failure. In other words, the tile-based processing covers processing of event data from certain coordinates across entire first tile area, and further updating map data of all the links within the first tile at once. The first tile area may include multiple links, subsequently tile-based processing may enable determination of road conditions of all of the multiple links due to the occurrence of the event, without processing event data from each of the corresponding multiple links.

While performing tile-based processing of the received event data during the occurrence of the event, the tile-based processing module 202c may update road conditions and navigation instructions corresponding to the entire first tile. As a result, event data to be processed form the first tile may reduce substantially for navigation and anomalies warning system.

For example, a warning indication, such as a warning message, may be provided as part of navigation instructions, during the occurrence of the event. In an example, the tile-based processing module 202c may determine a first time period corresponding to the occurrence of the event, based on the historical occurrences of the event. For example, the first time period may be determined based on an average time period of historical occurrences of the event. To this end, the first time period may be indicative of a time period for which the event is predicted to last, i.e., exist or occur, during the present occurrence of the event in the first tile. Subsequently, the tile-based processing module 202c may be configured to update map data corresponding to the first tile to indicate the occurrence of the event for the first time period. Based on the updated map data, navigation instructions may be updated. To this end, owing to map data indicating the occurrence of the event for the first time period, the navigations instructions may indicate the occurrence of the event for the first time period, such as by way of warning indications.

In an example, the first time period may be pre-defined and stored within the map database 106b, based on a type of the event. For example, a pre-defined first time period corresponding to the event may be updated based on current determination of the first time period and/or an actual time period of the occurrence of the event. For example, in a case where the occurrence of the event ceases to exist after the first time period, an updated first time-period may be determined based on the previously determined first time period, historical occurrences and updated event data that may be received subsequent to the currently received event data.

In another example, the link-based processing module 202d may be configured to perform link-based processing of the received event data when the comparison module 202b determines that the first count value is lesser than the threshold count value. In such a case, the link-based processing module 202d may identify event data received from each of the one or more links or portions of roads within the first tile. Subsequently, the link-based processing module 202d may determine road information, such as road condition, volume, speed, etc., corresponding to each of the link within the first tile. The link-based processing may be performed, for example, by map matching, geocoding, routing, and so forth, for each of the links in the first tile. To this end, the link-based processing module 202d may update map data corresponding to each of the multiple links within the first tile separately.

In an example embodiment, the count value generation module 202a may determine the first count value based on event data received within a first time period, such as 30 seconds, corresponding to the first tile. Thereafter, the comparison module 202b may retrieve the threshold count value from the map database 106b, or the threshold determination module 202e. The comparison module 202b may then determine the first count value of the first time period of the occurrence of the event in the first tile to be lesser than the threshold count value. In such a case, link-based processing module 202d may be triggered to perform link-based processing on the received event data and update map data. Thereafter, after a second time-period, the count value generation module 202a may determine an updated first count value based on event data received within the second time period, such as 30 seconds after the first time period. The comparison module 202b may again compare the updated first count value with the threshold count value. For example, the comparison module 202b may determine the updated first count value of the second time period of the occurrence of the event in the first tile to be greater than the threshold count value. In such a case, the tile-based processing module 202c may be triggered to perform tile-based processing on the received event data and update map data. In this manner, a manner of processing of the received event data may be switched to handle heavy load and prevent system failure or overburdening of the system 102.

In accordance with an embodiment, the processor 202 may also store the received event data corresponding to the occurrence of the event within the first tile in the map database 106b along with corresponding processed information. In an example, the processed information from the tile-based processing module 202c and/or the link-based processing module 202d may then be fed to the routing module 202f. The routing module 202f may be configured to generate user readable or user-understandable navigation instructions, such as routing messages, notifications, warning messages, etc., based on the processed event data. The routing module 202f may send or push the routing messages to user equipment, such as user equipment on-board the vehicles 108, to enable routing of the vehicles 108. For example, in case of tile-based processing, when map data corresponding to the first tile is updated to indicate the occurrence of the event, the routing module 202f may indicate occurrence of the event on each of the multiple links within the first tile. Subsequently, the routing module 202f may provide warning as part of navigation instructions to each of the vehicles moving across any of the links or roads within the first tile, or vehicles that may cross any of the multiple links of the first tile during a course of their travel on a route. Alternatively, in case of link-based processing, the routing module 202f may provide warning as part of navigation instructions to certain links, based on link-specific processing of event data within the first tile.

The processor 202 may retrieve computer executable instructions that may be stored in the memory 204 for execution of the computer executable instructions. The memory 204 may store the received event data associated with the first tile. In accordance with an embodiment, the processor 202 may be configured to retrieve input (such as, real-time sensor data, historical probe data, real-time probe data, map data indicating map attributes associated with plurality of links within the first tile, event data, and historical event data) from background batch data services, streaming data services or third party service providers, and renders output, such as, the first count value, threshold count value, tile-based processed information, link-based processed information, navigation instructions, updated map data, and notification associated with the processing of event data for use by the end user on the vehicles 108 through the I/O interface 206.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally or alternatively, the processor 202 may include one or more processors configured in tandem via the bus to enable independent execution of instructions, pipelining and/or multithreading. Additionally or alternatively, the processor 202 may include one or more processors capable of processing large volumes of workloads and operations to provide support for big data analysis. In an example embodiment, the processor 202 may be in communication with the memory 204 via a bus for passing information among components of the system 102.

The memory 204 may be non-transitory and may include, for example, one or more volatile and/or non-volatile memories. In other words, for example, the memory 204 may be an electronic storage device (for example, a computer readable storage medium) comprising gates configured to store data (for example, bits) that may be retrievable by a machine (for example, a computing device like the processor 202). The memory 204 may be configured to store information, data, content, applications, instructions, or the like, for enabling the system 102 to carry out various functions in accordance with an example embodiment of the present disclosure. For example, the memory 204 may be configured to buffer input data for processing by the processor 202. As exemplarily illustrated in FIG. 2A, the memory 204 may be configured to store instructions for execution by the processor 202. As such, whether configured by hardware or software methods, or by a combination thereof, the processor 202 may represent an entity (for example, physically embodied in circuitry) capable of performing operations according to an embodiment of the present disclosure while configured accordingly. Thus, for example, when the processor 202 is embodied as an ASIC, FPGA or the like, the processor 202 may be specifically configured hardware for conducting the operations described herein.

Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor specific device (for example, a mobile terminal or a fixed computing device) configured to employ an embodiment of the present disclosure by further configuration of the processor 202 by instructions for performing the algorithms and/or operations described herein. The processor 202 may include, among other things, a clock, an arithmetic logic unit (ALU) and logic gates configured to support operation of the processor 202. The network environment, such as, 100 may be accessed using the I/O interface 206 of the system 102. The I/O interface 206 may provide an interface for accessing various features and data stored in the system 102.

The processor 202 of the system 102 may be configured to determine first count value, based on the received event data and the threshold count value. Further, based on the comparison of the first count value with the threshold count value, tile-based processing or link-based processing may be performed on the received event data to determine road conditions within the first tile. The processor 202 may be further configured to update map data corresponding to the first tile and navigation instructions for travelling across the first tile, based on the link-based or tile-based processing of the received event data.

The memory 204 of the system 102 may be configured to store a dataset (such as, but not limited to, the event data, the sensor data, the probe data, and the map data) associated with the multiple links within the first tile. In accordance with an embodiment, the memory 204 may include processing instructions for processing event data. The dataset may include real-time data and historical data, from service providers. The memory 204 of the system 102 may be configured to store the first count value, threshold count value, processed event data, updated navigation instructions, updated map data, and warning or incident related messages.

In some example embodiments, the I/O interface 206 may communicate with the system 102 and displays input and/or output of the system 102. As such, the I/O interface 206 may include a display and, in some embodiments, may also include a keyboard, a mouse, a joystick, a touch screen, touch areas, soft keys, one or more microphones, a plurality of speakers, or other input/output mechanisms. In one embodiment, the system 102 may comprise user interface circuitry configured to control at least some functions of one or more I/O interface elements such as a display and, in some embodiments, a plurality of speakers, a ringer, one or more microphones and/or the like. The processor 202 and/or I/O interface 206 circuitry comprising the processor 202 may be configured to control one or more functions of one or more I/O interface 206 elements through computer program instructions (for example, software and/or firmware) stored on a memory 204 accessible to the processor 202. The processor 202 may further render notification associated with the navigation instructions, such as traffic conditions, ETA, routing information, road conditions, warning, etc., on the user equipment or audio or display onboard the vehicles 108 via the I/O interface 206.

In some embodiments, the processor 202 may be configured to provide Internet-of-Things (IoT) related capabilities to users of the system 102 disclosed herein. The IoT related capabilities may in turn be used to provide smart city solutions by providing real time warnings, big data analysis, and sensor-based data collection by using the cloud based mapping system for providing accurate navigation instructions and ensuring driver safety. The I/O interface 206 may provide an interface for accessing various features and data stored in the system 102.

FIG. 2B shows a format of the map data 200b stored in the map database 106b according to one or more example embodiments. In the FIG. 2B, the map data 200b is stored by specifying a road segment data record 208. The road segment data record 208 is configured to represent data that represents a road network. In FIG. 2B, the map database 106b contains at least one road segment data record 208 (also referred to as "entity" or "entry") for each road segment in a geographic region. In one example, an area of the geographic region may correspond to an area of the first tile. In such a case, the geographic region or the first tile may include one or more links, i.e., one or more road segments, and one or more nodes or intersections. In another example, the geographic region may include multiple tiles.

The map database 106b that represents a geographic region also includes a node database record (depicted as, a node data record 210a and a node data record 210b) (or "entity" or "entry") for each intersection associated with the at least one road segment shown by the road segment data record 208. (The terms "intersection" and "segments" represent only one terminology for describing these physical geographic features and other terminology for describing these features is intended to be encompassed within the scope of these concepts). Each of the node data records 210a and 210 may have associated information (such as "attributes", "fields", etc.) that allows identification of the road segment(s) that connect to it and/or its geographic position (e.g., its latitude and longitude coordinates).

FIG. 2B shows some of the components of the road segment data record 208 contained in the map database 106b. The road segment data record 208 includes a segment ID 208a by which the data record can be identified in the map database 106b. Each road segment data record 208 has associated with it information (such as "attributes", "fields", etc.) that describes features of the represented road segment. The road segment data record 208 may include data 208b that indicate the restrictions, if any, on the direction of vehicular travel permitted on the represented road segment. The road segment data record 208 includes data 208c that indicate a static speed limit or speed category (i.e., a range indicating maximum permitted vehicular speed of travel) on the represented road segment. The static speed limit is a term used for speed limits with a permanent character, even if they are variable in a pre-determined way, such as dependent on the time of the day. The static speed limit is the sign posted explicit speed limit for the road segment, or the non-sign posted implicit general speed limit based on legislation.

The road segment data record 208 may also include data 208d indicating the two-dimensional ("2D") geometry or shape of the road segment. If a road segment is straight, its shape can be represented by identifying its endpoints or intersections. However, if a road segment is other-than-straight, additional information is required to indicate the shape of the road. One way to represent the shape of an other-than-straight road segment is to use shape points. Shape points are points through which a road segment passes between its end points. By providing the latitude and longitude coordinates of one or more shape points, the shape of an other-than-straight road segment can be represented. Another way of representing other-than-straight road segment is with mathematical expressions, such as polynomial splines.

The road segment data record 208 also includes road grade data 208e that indicate the grade or slope of the road segment. In one embodiment, the road grade data 208e include road grade change points and a corresponding percentage of grade change. Additionally, the road grade data 208e may include the corresponding percentage of grade change for both directions of a bi-directional road segment. The location of the road grade change point is represented as a position along the road segment, such as thirty feet from the end or intersection of the road segment. For example, the road segment may have an initial road grade associated with its beginning intersection. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 208*e* includes the road grade change points and an actual road grade value for the portion of the road segment after the road grade change point until the next road grade change point or end intersection. In a further embodiment, the road grade data 208*e* includes elevation data at the road grade change points and intersections. In an alternative embodiment, the road grade data 208*e* is an elevation model which may be used to determine the slope of the road segment.

The road segment data record 208 also includes data 208*g* providing the geographic coordinates (e.g., the latitude and longitude) of the end points of the represented road segment. In one embodiment, the data 208*g* are references to the node data records 210 that represent the intersection corresponding to the end points of the represented road segment.

The road segment data record 208 may also include or be associated with other data 208*f* that refer to various other attributes of the represented road segment. The various attributes associated with a road segment may be included in a single road segment record or may be included in more than one type of record which cross-reference each other. For example, the road segment data record 208 may include data identifying the name or names by which the represented road segment is known, the street address ranges along the represented road segment, and so on.

FIG. 2B also shows some of the components of the node data record 210*a* and 210*b* contained in the map database 106*b*. Each of the node data records 210*a* and 210*b* may have associated information (such as "attributes", "fields", etc.) that allows identification of the road segment(s) that connect to the node and/or the node's geographic position (e.g., its latitude and longitude coordinates). For the embodiment shown in FIG. 2B, the node data records 210*a* and 210*b* include the latitude and longitude coordinates 210*a*1 and 210*b*1 for corresponding intersection. The node data records 214*a* and 214*b* may also include other data 210*a*2 and 210*b*2 that refer to various other attributes of the intersections. In some embodiments, the node data records 210*a* and 210*b* may be associated with at least one first point and at least one second point, which may be border points of a feature line or lane marking and at least one second line in vicinity of the feature line (or at least one first point) respectively.

Thus, the overall data stored in the map database 106*b* may be organized in the form of different layers for greater detail, clarity, and precision. Specifically, in the case of high definition maps, the map data may be organized, stored, sorted, and accessed in the form of three or more layers. These layers may include road level layer, lane level layer and localization layer. The data stored in the map database 106*b* in the format shown in FIG. 2B may be combined with other formats of map data to provide three or more layers of information. In some embodiments, there may be lesser or fewer number of layers of data also possible, without deviating from the scope of the present disclosure.

FIG. 2C illustrates a block diagram 200*c* of the map database 106*b* storing map data or geographic data 212 in the form of road segments/links, intersections, and one or more associated attributes as discussed above. Furthermore, attributes may refer to features or data layers associated with the link-intersection database, such as an HD lane data layer.

In addition, the map data 212 may also include other kinds of data 214. The other kinds of data 214 may represent other kinds of geographic features or anything else. The other kinds of data 214 may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The map database 106*b* also includes indexes 216. Also, the other data 214 may be event data or information associated with the occurrence of the event within the first tile. The indexes 216 may include various types of indexes that relate the different types of data to each other or that relate to other aspects of the data contained in the geographic database 106*b*.

The data stored in the map database 106*b* in the various formats discussed above may help in providing precise data for high definition mapping applications, autonomous vehicle navigation and guidance, cruise control using ADAS, direction control using accurate vehicle maneuvering and other such services. In some embodiments, the system 102 accesses the map database 106*b* storing data in the form of various layers and formats depicted in FIGS. 2B-2C, to retrieve map data or information from the map database 106*b*. The system 102 may retrieve event data, sensor data, traffic-related information and other information relating to road segment, tile and link topology and geometry.

FIG. 3 illustrates an example map 300 of a geographic region 302 used in the system 102 for tile-based processing, in accordance with one or more example embodiments. A grid 304 is formed of grid lines that divide the represented geographic region 302 into a plurality of areas, or map tiles 306. The lines of the grid 304 represent the boundaries of the map tiles 306. In this embodiment, the map tiles 306 are rectangular; however, in alternative embodiments the map tiles 306 may have other shapes. In a present embodiment, these map tiles 306 all have the same dimensions, as shown in FIG. 3. In a present embodiment, the dimensions of a map tiles are approximately four miles square. In alternative embodiments, other dimensions may be used. The grid, 304 may be a grid or array of geometric shapes (e.g., uniform sized geometric shapes), such as tiles, sections, blocks, points, dots, circles, polygons, or other shapes. The grid 304 covers an entire ground area of the region 302. A ground area refers to a surface, plane, or floor or a portion thereof that can be moved upon as well as the surface in which objects or barriers may be placed or positioned on or over.

In an example, the grid 304 may be applied over certain areas of the region 302 rather than the entire ground area of the region 302. For example, the grid 304 may be applied only in movable areas, such as an area covering links, roads, and intersections. In such as case, the grid 304 may have a shape that corresponds to an-accessible contiguous sub-area within the real-world region 302 in which the shape has a boundary that corresponds to the walls, trees, water body or other obstructions surrounding the links, roads, and intersections in the geographical region 302. Also, tiles may automatically fill into vehicle-movable areas. For example, links, roads and intersections or other open movable area may be selected to automatically fill the area with tiles or sections of the grid 304.

In accordance with an example, data corresponding to a map tile contains a plurality of individual data records that represent geographic features that are encompassed within the corresponding map tile area 308. For example, the data records may represent the geographic features, such as the roads, intersections, points of interest, and other features, encompassed within a corresponding map tile area 308. All the map tile areas taken together, make up the entire region 302. In an example, the data records corresponding to the map tiles are pre-computed.

The map tiles 306 are numbered or otherwise associated with an index so that each map tile 306 can be specifically identified. The numbering may be based on the geographic locations of the map tile areas.

In accordance with an example, the map tiles 306 may be assigned or designated coordinates, such as local or global map coordinates. For example, each center of the tile 306 or other part of the tile is given a (x,y), latitude and longitude, or other coordinate designation. One of the tiles 306, such as at a corner of the image, may be designated as an origin point (0,0) for reference and positioning purposes. The coordinates allows items, features, or regions to be searchable. However, for routing purposes, the coordinates may not be used.

In one embodiment, a geographic database, such as a geographic database stored within the map database 106b, is presented according to a hierarchical or multi-level tile projection. More specifically, in one embodiment, the geographic database may be defined according to a normalized Mercator projection. This may not be construed as a limitation for projecting the geographic database, other projections may be used in other embodiments. In one embodiment, a map tile grid of a Mercator or similar projection may be a multilevel grid, for example, the multilevel grid comprising the grid 304. In an example, each of the map tiles in a level of a grid is divisible into a same number of tiles of that same level of grid. In other words, an initial level of the grid (e.g., a level at the lowest zoom level) is divisible into four cells or rectangles. Each of those cells are in turn divisible into four cells, and so on until the highest zoom level of the projection is reached.

In one embodiment, the grid 304 may be numbered in a systematic fashion to define a tile identifier (tile ID). For example, a top left tile may be numbered 00, a top right tile may be numbered 01, a bottom left tile may be numbered 10, and a bottom right tile may be numbered 11. In one embodiment, each cell is divided into four rectangles and numbered by concatenating corresponding parent tile ID and a new tile position. It may be noted, other variety of numbering schemes is also possible. Any number of levels with increasingly smaller geographic areas may be represented by the grid. Any level (n) of a grid may have 2(n+1) cells or tiles. Accordingly, any tile of the level (n) has a geographic area of A/2(n+1) where A is the total geographic area of the world or the total area of the geographic region 302. Because of the numbering system, the exact position of any tile in any level of the grid or projection may be uniquely determined from the corresponding tile ID.

In one embodiment, the system 102 and/or the tile-based processing module 202c may identify a tile by a quadkey determined based on corresponding tile ID of the tile of the grid. The quadkey, for example, is a one dimensional array including numerical values. In one embodiment, the quadkey may be calculated or determined by interleaving bits of a row and a column coordinates of the tile in the grid at a specific level. The interleaved bits may be converted to a predetermined base number (e.g., base 10, base 4, hexadecimal). In one example, leading zeroes are inserted or retained regardless of the level of the grid in order to maintain a constant length for the one-dimensional array of the quadkey. In another example, the length of the one-dimensional array of the quadkey may indicate the corresponding level within the multilevel grids. In one embodiment, the quadkey is an example of a hash or an encoding scheme of respective geographical coordinates of a geographical data point that may be used to identify a tile in which the geographical data point is located.

It is envisioned that the system 102 and/or the tile-based processing module 202c may be configured to search for geographic points (e.g., coordinates or other location points), map tiles 306, one or more road links or segments, nodes, points of interests (POIs), and/or any other map feature or area represented in a geographic database when performing an analysis of traffic data, route data, or weather data, or a combination thereof.

In an example, the data record corresponding to the map tiles 306 may include different types of geographic data. In an example, data record may include different navigation-related and map-related functions that can be performed on the end users' mobile units using the geographic data. Performing different navigation- or map-related functions may be facilitated by organizing the geographic data into types based on the function to be performed. When geographic data is organized by type, each type includes the data attributes needed for performing a specific function but may exclude attributes that are not needed for that function. As an example, event data may include data that indicates which roads connect to each other, road conditions, topography of the roads, but may exclude data about street names, traffic information, bodies of water, that are not needed for processing event data. For example, such specific type of data corresponding to the tiles 306 in the geographic region 302 may be retrieved to process the event data. In an example, data record corresponding to a first tile from the tiles 306 may be retrieved by the system 102. The data record may indicate, for example, links and intersections within the first tile, connection between links and intersections within the first tile and neighboring tiles, road geometry and topography, coordinates, and so forth. In certain cases, data record corresponding to neighboring tiles of the first tile may also be retrieved for processing event data corresponding to the first tile. In addition, the system 102 may determine an appropriate order for retrieving different types of geographic data or data records. There may be various other alternatives.

In an example, data relating to occurrence of a weather event may be stored within the data record. The data may be used to generate a warning. Such warning may be added as text to the navigable tiles associated with the links, roads, intersections, and other navigable areas for differentiation purposes. The added text may or may not be visible to an end user.

In this manner, tiles 306 may be determined within the geographical region 302 where the weather event is occurring. Based on the identified tiles 306 and received event data, event data processing may be performed for each tile within the region 304. As may be understood, event data may be received from links, roads, and intersections of navigable tiles. Subsequently, road conditions may be determined for links, roads, and intersections of the navigable tiles, based on the event data received from corresponding navigable tiles. In certain cases, the data record or map data associated with the navigable tiles may be updated to indicate the occurrence of the event, such as the weather event, within the corresponding tile.

FIG. 4 illustrates an example flowchart 400 for implementation of a method to process event data, in accordance with an example embodiment. More, fewer, or different steps may be provided.

At 402, event data relating to an occurrence of an event corresponding to a first tile may be received. The processor 202 may be configured to receive the event data from vehicles travelling within the first tile. In an example, the event data may relate to an occurrence of a weather event. In accordance with an example, the first tile may correspond to a map tile area.

At 404, a first count value associated with the received event data related to the occurrence of the event may be determined. The first count value may indicate a number of reports of the occurrence of the event from same or different vehicles within the first tile, and within a pre-defined time period. To this end, the processor 202 may be configured to periodically determine updated first count value, using a count value generation module 202a, during the occurrence of the event and on receiving subsequent event data from the vehicles within the first tile.

In accordance with an embodiment, the event data may relate to a slippery road event. For example, such slippery road event may be caused due to snowstorm. In addition, such slippery road event may occur in an entire geographical region at the same time. It may be noted that an area of such geographical region may be large, for example, more than a thousand kilometer square. As a result, each of the vehicles located within such large area of geographical region may send event data to the system 102 or the mapping platform 104. Owing to large number of event data received from vehicles all over the geographical region, a system that may be configured to process such event data may experience overload and may fail. To avert such system failure, the geographical region may be divided into to one or more tiles. Further, the system 102 may be configured to handle or process event data on tile-level. Pursuant to present example, event data from a first tile within the geographic region may be processed. However, this should be construed as a limitation. In other embodiments of the present disclosure, the system 102 may be configured to process event data corresponding to more than one tile. For example, dimensions or boundaries of the tiles may be pre-defined, or autonomously determined based on the first count value.

At 406, a threshold count value associated with the occurrence of the event may be obtained. In an example, the threshold count value may be predetermined by the processor 202 and stored within the map database 106b. For example, the threshold count value may be determined based on a mean or average of historical event data received during one or more historical occurrences of the event within the first tile and/or outside the first tile. In an example, the threshold count value may be determined in real-time, for example, corresponding to the first tile.

At 408, a dynamic switching between a link-based processing and a tile-based processing is performed, based on a comparison between the first count value and the threshold count value. In an example, the processor 202 may compare the first count value with the threshold count value, using a comparison module 202b. In an example, on determining the first count value to be lesser than the threshold count value, the link-based processing for the received event data may be performed. Alternatively, on determining the first count value to be greater than the threshold count value, the tile-based processing for the received event data may be performed.

In accordance with an embodiment, when the first count value is greater than the threshold count value, it may indicate that large quantity of event data is received and therefore load of processing is high. Subsequently, switching a mode of processing of such large quantity of event data to tile-based processing may reduce the number of event data to be processed for determining road conditions or any event related condition within the first tile. For example, while performing the tile-based processing, some of the event data from the received event data may have to be processed. For example, the some of the event data may correspond to certain specific coordinates or locations, such as along boundary of the first tile, location corresponding to certain points of interests within the first tile, and other specific locations, associated with the first tile. Moreover, during tile-based processing, processing operations, such as map matching, may not be performed. Owing to reduced number of event data to be processed and the tile-based processing, the processing load may reduce substantially. To this end, the tile-based processing may process the event data at the tile-level, i.e., a larger geographic area. As a result, tile-based processing of the event data from multiple links within the first tile may be processed as one batch to update map data corresponding to the entire tile, i.e., the multiple links, at once.

In addition, on determining the first count value to be lesser than the threshold count value, the link-based processing of the received event data is performed. For example, the link-based processing of one or more links within the first tile may include map matching and integrating event data and other traffic information on link basis and/or lane-by-lane basis, to determine point-to-point navigation instructions. For example, based on link-based processing of the event data for the first tile, color-coded traffic flow information corresponding to each link may be used to provide traffic or incident flow information and warning for the event. To this end, the link-based processing may include processing of event data from each of the multiple links in the first tile separately. As a result, focused processing of event data from one of the multiple links and update of corresponding map data is performed in one batch, or at one time. In this manner, map data of multiple links may be updated separately during such link-based processing. In accordance with an example, once a mode of processing for the received event data is determined, then the received event data may be suitably processed. Further, the method 400 a may go back to 404 for determining updated first count value corresponding to event data that may be received subsequent to the currently received and processed event data. Accordingly, comparison between the updated first count value and the threshold count value may be performed again, and type of processing, i.e., link-based processing or tile-based processing, may be determined again. In case where the type of processing determined for processing the subsequent event data is different from the type of processing used for processing the currently received and processed event data, the type of processing may be switched in real-time.

In accordance with an example, the slippery road event may be reported by millions of vehicles located or moving within the first tile. In such cases, processing of such large number of event data may not be possible, especially, for generating real-time updates. Therefore, in such cases, switching to the tile-based processing of the received event data may be suitable to prevent system failure and provide real-time update of road condition, event condition, and so forth, to users. Such updates may be provided as part of navigation instructions to the users, such as drivers of vehicles, in order to ensure driver safety and avert any hazardous condition, such as accidents, due to the event of slippery road. For example, in tile-based processing, the system 102 may update map data corresponding to the entire tile for a pre-determined time period to indicate the occurrence of the slippery event. Such pre-determined time period may be determined based on historical occurrences of the slippery road event. For example, in the case of slippery road event, the pre-determined time period may be in a range of thirty minutes to twenty-four hours.

FIG. 5 illustrates an example flowchart 500 for implementation an exemplary method to process event data, in accordance with an example embodiment. In an example, the exemplary method disclosed in flowchart 500 may be performed subsequent to the method 400, specifically, subsequent to the step 408. In another example, the exemplary method disclosed in flowchart 500 may be performed as a part of the step 408. In particular, the exemplary method disclosed in the flowchart 500 may be performed on determining the first count value to be greater than the threshold count value in the step 408. In such case, the method may move to 502 from 408. Fewer, more, or different steps may be provided.

At 502, a first time threshold and a first distance threshold may be determined. In this regard, the processor 202 may be configured to determine the first time threshold and the first distance threshold, using the threshold determination module 202e. In an example, the first time threshold and the first distance threshold may be determined, based on the historical event data relating to historical occurrences of the event and the first count value of the received event data relating to the occurrence of the event. For example, already received event data (referred to as the currently received event data, hereinafter) may be received during a first time period. In an example, the first time threshold may indicate a time value, for example, in seconds, minutes, or hours, for receiving subsequent event data from the vehicles within the first tile. Similarly, the first distance threshold may indicate a distance value, for example, in millimeters, centimeters, meters, and kilometers, for receiving the subsequent event data from the vehicles within the first tile. Using the first time threshold and the first distance threshold, the system 102 may set a limit for receiving the subsequent event data during a second time period. In an example, the subsequent event data may be received during the second time period, wherein the second time period occurs or starts after the first time period.

At 504, the first time threshold is utilized for receiving the subsequent event data corresponding to the first tile. In accordance with an example, the currently received event data may be received during the first time period from vehicles within the first tile. Further, the subsequent event data may be received during a second time period. To this end, the second time period may be first time threshold apart from the first time period. For example, the processor 202 may ignore any event data received form the vehicles within the first tile, or block receiving of event data, during a time period between the first time period and the second time period. It may be noted, the second time period may occur in time after the first time period.

In accordance with an example, the event may be slippery road event. In such a case, owing to very large amount of event data being received, the first time threshold may be wide, i.e., may be longer in time. For example, the first time threshold may be 30 minutes. Subsequently, a subsequent event data that may be received for further processing from a given location may be 30 minutes apart from a currently received event data received from the given location. It may be noted that the first time threshold is determined based on a first count value of the received event data. Therefore, a range of the first time threshold may vary based on the size of first tile, number of the vehicles in the first tile, number of events reported, and the like.

At 506, the first distance threshold is utilized for receiving the subsequent event data corresponding to the first tile. In accordance with an example, the subsequent event data may be received during the second time period. For example, the subsequent event data may include a first subsequent event data corresponding to a first location within the first tile, and a second subsequent event data corresponding to a second location within the first tile. In such a case, the first location may be first distance threshold apart from the second location.

In accordance with an example, the event may be slippery road event. As described above, very large amount of event data may be received during the slippery road event. For example, the first distance threshold may be 300 meters. Accordingly, subsequent event data from locations that are 300 meters apart from each other may be received for further processing. In other words, a first location from where a subsequent event data is received in a given time is 300 meters apart from a second location from where another subsequent event data is received in the given time. It may be noted that the first distance threshold is determined based on a first count value of the received event data. Therefore, the range of the first distance threshold may vary based on the size of first tile, number of the vehicles in the first tile, number of event reported, and the like It may be understood, the subsequent event data may include subsequent event data from different locations within the first tile. Such locations may be first distance threshold apart from each other. The processor 202 may ignore or block any subsequent event data from vehicles that are lying within an area that is between locations from where the subsequent event data is to be received.

At 508, the currently received event data received during the first time period and the subsequent event data received during the second time period may be processed. In an example, tile-based processing may be performed on the currently received and subsequent event data. Based on the tile-based processing, occurrence of any weather event or any other event affecting normal road conditions may be identified. Further, the tile-based processing may be performed on the received event data to reduce an amount of event data to be processed for determining road conditions and updating map data corresponding to the entire tile to indicate the occurrence of the event within the first tile and generating or updating navigation instructions. For example, event data corresponding to certain points, such as boundary points of the tiles within the first tile may be processed for updating the map data for the entire first tile and generating or updating navigation instructions corresponding to the first tile. In an example, the generated navigation instructions may include incident message or warning message to indicate potentially hazardous or unsafe driving condition and/or abnormal road conditions, within the first tile.

It may be understood, a tile-specific first time threshold and a tile-specific first distance threshold may vary for different tiles. For example, for a tile having heavily congested links, values of the tile-specific first time threshold and the tile-specific first distance threshold may be higher. Alternatively, for a tile having fewer vehicles reporting the occurrence of the event, the tile-specific first time threshold and the tile-specific first distance threshold may be lower.

FIG. 6 illustrates an example flowchart 600 for implementation of a method to process weather data, in accordance with an example embodiment. Fewer, more, or different steps may be provided.

At 602, weather data relating to an occurrence of a weather event may be received. In an example, the weather data may be received from one or more vehicles within a first tile. The first tile may include one or more links of a road network. Examples of weather event may include, but are not limited to, snowstorms, slippery roads, windstorms, reduced visibility, fog, dust storm, heavy rainfall, blizzard, flood, and so forth.

At 604, a first count value corresponding to the first tile may be determined. The first count value may be associated with the received weather data related to the occurrence of the weather event. In an example, the first count value may be based on a number of weather data instances received from different vehicles within the first tile, within a time period of, for example, 30 seconds, a minute, two minutes, and so forth. The first count value may indicate a number of times the occurrence of the weather event was reported, or weather data was transmitted. It may be noted, different tiles may have corresponding different first count value. For example, in case of a slippery road event, more than several thousands of vehicle may report the occurrence of the event from different tiles. Subsequently, the first count value may range from several thousands to millions.

At 606, a threshold count value corresponding to the first tile may be obtained. In an example, the threshold count value may be pre-determined based on one or more historical occurrences of the weather event within the first tile. In accordance with an embodiment, the threshold count value may be determined based on twice of a mean count or average of a number of historical weather data received during the one or more historical occurrences of the weather event.

In accordance with an example, an average number of events is calculated for the first tile over each month or a fortnight, using historical data relating to the one or more historical occurrences of the weather event. Subsequently, a threshold count value may be determined for the first tile as twice of the average number of events reported for the corresponding tile over the month or fortnight. For example, in case of a slippery road event, the threshold count value may be higher in months, for example, September and March, when frequency of occurrence of such event may be high. On the other hand, the threshold count value may be lower in months, for example, December, January, and June, when frequency of occurrence of such event may be low.

At 608, a dynamic switching between a link-based processing and a tile-based processing is performed, based on a comparison between the first count value and the threshold count value. In this regard, on determining the first count value to be greater than the threshold count value, the tile-based processing of the received event data is performed. In addition, on determining the first count value to be lesser than the threshold count value, the link-based processing of the received event data is performed.

In an example, tile-based processing of the received weather data corresponding to the first tile may be performed, in order to determine road conditions within the first tile and updated navigation and routing instructions for the first tile. For example, on identifying the occurrence of a weather event, the navigation instructions corresponding to the first tile, i.e., links and intersections within the first tile or all navigable roads within the first tile, may be updated to provide warning message and updated road conditions. The warning message and the updated road condition may include, for example, information relating to the weather event, high congestion areas, high risk areas, routes, or links to avoid, alternate routes or links that may be used, unsafe driving environment, road condition information, vehicle condition information, estimated time of clearing or subsiding of the weather event, and other traffic related information. In certain cases, the entire first tile, i.e., all the navigable routes within the first tile, may be updated as experiencing the weather event for a first pre-defined time period. Such first pre-defined time period may indicate an approximate time for which the weather event may continue to occur or exist. In an example, the first pre-defined time period may be determined based on historical occurrences of the weather event in the first tile or other tiles.

In accordance with an embodiment, on determining the first count value of the received weather data from the first tile to be greater than the threshold count value of the first tile, a first time threshold and a first distance threshold for the first tile may be determined. In an example, the first time threshold and the first distance threshold may be used to set a limit for receiving subsequent weather data corresponding to the first tile regarding the occurrence of the weather event. For example, the currently received weather data may be received from the first tile during a first time period. Subsequently, the subsequent weather data corresponding to the first tile may be set to be received during a second time period that is first time threshold apart from the first time period. In addition, the subsequent weather data corresponding to the first tile may be set to be received from different locations within the first tile, wherein such locations are first distance threshold apart from each other.

For example, in the above-described example of slippery road weather event, large amount of event data may be received such that first count value of the event data may exceed the historic threshold count value. Thus, in such a case, switching may be done from link-based processing to tile-based processing depending on how current observation counts compared to historical counts. Accordingly, entire first tile may be marked as experiencing the weather event for a pre-determined time period. For example, map data of the first tile may be updated to indicate the occurrence of the slippery road event for next 30 minutes, 1 hours, 2 hours, 5 hours, 10 hours, 24 hours, and so forth.

On the other hand, on determining that the first count value is lesser than the threshold count value of corresponding, the link-based processing may be performed on the received weather data corresponding to the first tile. In this regard, if the first count value of the first tile is less than the threshold count value of the first tile, then each of the links or navigable routes within the first tile may be processed separately. For example, traffic condition may be determined based on map-matching of links and subsequent link-specific navigation and routing instructions may be generated.

In accordance with an embodiment, based on the link-based processing or the tile-based processing the map data corresponding to the first tile may be updated to indicate the occurrence of the weather event and to indicate updated road conditions.

Accordingly, blocks of the flowcharts 400, 500 and 600 support combinations of means for performing the specified functions and combinations of operations for performing the specified functions. It will also be understood that one or more blocks of the flowcharts 400, 500 and 600, and combinations of blocks in the flowcharts 400, 500 and 600, can be implemented by special purpose hardware-based computer systems which perform the specified functions, or combinations of special purpose hardware and computer instructions.

Alternatively, the system may comprise means for performing each of the operations described above. In this regard, according to an example embodiment, examples of means for performing operations may comprise, for example, the processor 202 and/or a device or circuit for executing instructions or executing an algorithm for processing information as described above.

On implementing the methods 400, 500 and 600 disclosed herein, the end result generated by the system 102 is a tangible report of the occurrence of the event and the generation of road conditions and navigation and routing instructions for the first tile. The report of the occurrence of the weather event is of utmost importance to provide information relating to any incident and to ensure driver safety.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for processing event data, the system comprising: a memory configured to store computer executable instructions; and one or more processors configured to execute the instructions to: receive event data relating to an occurrence of an event corresponding to a first tile; determine a first count value associated with the received event data related to the occurrence of the event; obtain a threshold count value associated with the event; and perform dynamic switching between a link-based processing and a tile-based processing, based on a comparison between the first count value and the threshold count value, wherein upon on determining the first count value to be greater than the threshold count value, the tile-based processing of the received event data is performed, and upon on determining the first count value to be lesser less than the threshold count value, the link-based processing of the received event data is performed.

2. The system of claim 1, wherein, the one or more processors are further configured to:
determine the threshold count value, based on a mean count associated with one or more historical occurrences of the event within the first tile.

3. The system of claim 2, wherein, the one or more processors are further configured to: upon on determining the first count value of the received event data to be greater than twice of the mean count of the one or more historical occurrences of the event, perform the tile-based processing of the received event data relating to the occurrence of the event.

4. The system of claim 3, wherein, the one or more processors are further configured to:
based on the one or more historical occurrences of the event, determine a first time period corresponding to the occurrence of the event; and
update map data corresponding to the first tile for the first time period to indicate the occurrence of the event.

5. The system of claim 1, wherein the one or more processors are further configured to: upon on determining the first count value to be lesser less than the threshold count value, identify event data corresponding to each of one or more links within the first tile from the received event data; and perform the link-based processing of the event data to update corresponding map data associated with each of the one or more links within the first tile.

6. The system of claim 1, wherein upon on determining the first count value of the received event data to be greater than the threshold count value, the one or more processors are further configured to: determine a first time threshold and a first distance threshold for receiving subsequent event data, based on the first count value; and set a limit on receiving the subsequent event data relating to the occurrence of the event corresponding to the first tile, based on the first time threshold and the first distance threshold.

7. The system of claim 6, wherein the one or more processors are further configured to: based on the first time threshold, receive the subsequent event data corresponding to the first tile, wherein the subsequent event data is received the first time threshold apart from the received event data; and based the first distance threshold, receive the subsequent event data corresponding to a first location and a second location within the first tile during a given time period, wherein the second location is apart from the first location by the first distance threshold.

8. The system of claim 1, wherein the one or more processors are further configured to:
based on the processing of the received event data, update a map database.

9. The system of claim 1, wherein the event is a weather event.

10. A method for processing weather data, the method comprising: receiving weather data relating to an occurrence of a weather event from one or more vehicles within a first tile, the first tile comprising one or more links of a road network; determining a first count value corresponding to the first tile, the first count value being associated with the received weather data related to the occurrence of the weather event; obtaining a threshold count value corresponding to the first tile, the threshold count value being associated with the weather event; and performing dynamic switching between a link-based processing and a tile-based processing, based on a comparison between the first count value and the threshold count value relating to the first tile, wherein upon on determining the first count value to be greater than the threshold count value, the tile-based processing of the received weather data is performed, and upon on determining the first count value to be lesser less than the threshold count value, the link-based processing of the received weather data is performed.

11. The method of claim 10, further comprising: upon on determining the first count value to be lesser less than the threshold count value, identifying weather data corresponding to each of the one or more links within the first tile from the received weather data; performing link-based processing of the received weather data to update corresponding map data associated with the one or more links within the first tile to indicate the occurrence of the weather event.

12. The method of claim 10, further comprising: upon on determining the first count value to be greater than the threshold count value, determining a first time threshold and a first distance threshold for receiving subsequent weather data corresponding to the first tile, the received weather data being received during a first time period; and based on the first distance threshold and the first time threshold, setting a limit for receiving subsequent weather data relating to the occurrence of the weather event corresponding to the first tile during a second time period.

13. The method of claim 12, the method further comprising receiving current weather data corresponding to the first tile during the first time period; and receiving the subsequent weather data corresponding to the first tile during the second time period, wherein the second time period is the first time threshold apart from the first time period.

14. The method of claim 12, further comprising receiving a first subsequent weather data corresponding to a first location within the first tile during the second time period; and receiving a second subsequent weather data from a second location within the first tile during the second time period, wherein the second location is the first distance threshold apart from the first location.

15. The method of claim 10, further comprising:
determining the threshold count value corresponding to the first tile, based on a mean count associated with one or more historical occurrences of the weather event within the first tile.

16. The method of claim 15, further comprising: upon on determining the first count value of the received weather data to be greater than twice of the mean count associated with the one or more historical occurrences, determining a first time period corresponding to the occurrence of the weather event; and updating map data corresponding to the first tile for the first time period to indicate the occurrence of the weather event.

17. The method of claim 10, further comprising:
based on the processing of the received weather data, updating a map database.

18. A computer programmable product comprising a non-transitory computer readable medium having stored thereon computer executable instructions, which when executed by one or more processors, cause the one or more processors to carry out operations for processing event data, the operations comprising: receiving event data relating to an occurrence of an event from a first tile; determining a first count value associated with the received event data related to the occurrence of the event; obtaining a threshold count value associated with the event within the first tile; performing dynamic switching between a link-based processing and a tile-based processing, based on a comparison between the first count value and the threshold count value, wherein upon on determining the first count value to be greater than the threshold count value, the tile-based processing of the received event data is performed, and upon on determining the first count value to be lesser less than the threshold count value, the link-based processing of the received event data is performed.

19. The computer programmable product of claim 18, wherein, upon on determining the first count value of the received event data to be greater than the threshold count value, the operations further comprising: determining a first time threshold and a first distance threshold for receiving subsequent event data, based on the first count value; based on the first time threshold, receiving the subsequent event data corresponding to the first tile, wherein the subsequent event data is received first time threshold apart from the received event data; and based on the first distance threshold, receiving the subsequent event data corresponding to a first location and a second location within the first tile during a given time period, wherein the second location is apart from the first location by the first distance threshold.

20. The computer programmable product of claim 18, wherein, the operations further comprising:
based on the one or more historical occurrences of the event, determining a first time period corresponding to the occurrence of the event; and
updating map data corresponding to the first tile for the first time period to indicate the occurrence of the event.

* * * * *